(12) United States Patent
Vivier

(10) Patent No.: US 11,244,276 B2
(45) Date of Patent: Feb. 8, 2022

(54) SECURE PRODUCT IDENTIFICATION AND VERIFICATION

(71) Applicant: Accenture Global Solutions Limited, Dublin (IE)

(72) Inventor: Clement Vivier, Suresnes (FR)

(73) Assignee: Accenture Global Solutions Limited, Dublin (IE)

( * ) Notice: Subject to any disclaimer, the term of this patent is extended or adjusted under 35 U.S.C. 154(b) by 188 days.

(21) Appl. No.: 16/695,465

(22) Filed: Nov. 26, 2019

(65) Prior Publication Data
US 2020/0097901 A1     Mar. 26, 2020

Related U.S. Application Data

(62) Division of application No. 16/158,809, filed on Oct. 12, 2018, now Pat. No. 10,515,333, which is a division of application No. 15/414,243, filed on Jan. 24, 2017, now Pat. No. 10,115,068.

(51) Int. Cl.
    *G06Q 10/08*      (2012.01)
    *H04L 9/32*      (2006.01)

(52) U.S. Cl.
    CPC ..... *G06Q 10/0832* (2013.01); *G06Q 10/0838* (2013.01); *H04L 9/3239* (2013.01); *H04L 2209/38* (2013.01)

(58) Field of Classification Search
CPC ......... G06Q 10/08; G06Q 50/28; G06Q 50/30
See application file for complete search history.

(56) References Cited

U.S. PATENT DOCUMENTS

| | | | |
|---|---|---|---|
| 7,085,777 B2 | 8/2006 | Beck et al. | |
| 10,115,068 B2 | 10/2018 | Vivier et al. | |
| 2004/0015477 A1* | 1/2004 | Beck | A01B 79/005 |
| 2011/0274275 A1* | 11/2011 | Seitz | G06Q 10/08 |
| | | | 380/270 |
| 2012/0235791 A1 | 9/2012 | Donlan et al. | |
| 2015/0377841 A1 | 12/2015 | Gaynor et al. | |

(Continued)

OTHER PUBLICATIONS

Apte, Shireesh, and Nikolai Petrovsky. "Will blockchain technology revolutionize excipient supply chain management?." Journal of Excipients and Food Chemicals 7.3 (2016): 910. (Year: 2016).*

(Continued)

*Primary Examiner* — Scott M Tungate
(74) *Attorney, Agent, or Firm* — Harrity & Harrity, LLP

(57) ABSTRACT

A device may receive an indication that a product has arrived at a destination. The product may have been shipped by an entity to the destination. The device may perform an analysis on the product to determine an attribute of the product. The device may perform a comparison of information identifying the attribute of the product and information included in an encrypted record, for the product, of a blockchain, to verify the attribute of the product. The information included in the encrypted record may be related to attributes of the product. The attributes of the product may have been determined by the entity that shipped the product to the destination. The device may determine whether the attribute of the product is verified based on performing the comparison. The device may perform an action based on determining whether the attribute of the product is verified.

20 Claims, 17 Drawing Sheets

(56) References Cited

U.S. PATENT DOCUMENTS

| | | |
|---|---|---|
| 2016/0033966 A1 | 2/2016 | Farris et al. |
| 2016/0069743 A1 | 3/2016 | McQuilkin et al. |
| 2016/0180274 A1 | 6/2016 | Zwakhals et al. |
| 2016/0269182 A1 | 9/2016 | Sriram et al. |
| 2017/0041148 A1* | 2/2017 | Pearce .................. H04L 9/3236 |
| 2019/0043008 A1 | 2/2019 | Vivier et al. |

OTHER PUBLICATIONS

Aung M.M., et al., "Traceability in a Food Supply Chain: Safety and Quality Perspectives," Food Control, 2014, vol. 39, pp. 172-184.

Cadman E., "Commonwealth Bank's Cotton Bale Blockchain Experiment Could Change Trade Forever," http://www.smh.com.au/business/banking-and-finance/commonwealth-banks-cot-ton-bale-blockchain-experiment-could-change-trade-forever-20161023-gs8x4n.html, Oct. 24, 2016, 3 pages.

Christidis K., et al., "Blockchains and Smart Contracts for the Internet of Things,"IEEE Access, 2016, vol. 4, pp. 2292-2303.

Ellis D., et al., "Point-and-shoot: Rapid Quantitative Detection Methods for On-site Food Fraud Analysis—moving Out of the Laboratory and into the Food Supply Chain," Analytical Methods, Nov. 21, 2015, vol. 7(22), pp. 9401-9414.

Everledger, "Protection," www.everledger.io, Jan. 10, 2017, 6 pages.

Hackett R., "Walmart and IBM are Partnering to Put Chinese Pork on a Blockchain," http://fortune.com/2016/10/19/walmart-ibm-blockchain-china-pork/, Oct. 19, 2016, 4 pages.

Kurki J., "Benefits and Guidelines for Utilizing Blockchain Technology in Pharmaceutical Supply Chains, Case Bayer Pharmaceuticals," 2016, 26 pages.

Mattson U.S., "Fingerprinting of Oil by Infrared Spectrometry," https://www.researchgate.net/publication/231203653_Fingerprinting_of_oil_by_infrared_spectrometry, Nov. 1971, 2 pages.

Rodriguez N., "Going Mainstream: Blockchain's Open-Source Ethos Collides with Corporate America," http://www.law360.com/in-depth/articles/850209?nl_pk=17d1a302-9b01-4d7ab50e78b2289d87fb&utm_source=newsletter&utm_medium=email&utm_campaign=in-depth, Oct. 17, 2016, 14 pages.

Shireesh A., et al., "Will Blockchain Technology Revolutionize Excipient Supply Chain Management?," Journal of Excipients and Food Chemicals, 2016, vol. 7 (3), pp. 76-78.

Shrier D., et al., "Biockchain & Transactions, Markets and Marketplaces," Connection Science & Engineering, Massachusetts Institute of Technology, 2016, 18 pages.

Smart Contract, "Data and Payments for your Smart Contracts," https://smartcontract.com/, Nov. 15, 2016, 4 pages.

Speight J.G., "Analytical Methods and Techniques Applied to Crude Oil and Petroleum Products," http://www.eolss.net/Sample-Chapters/C08/E6-185-12.pdf, Jun. 5, 2011, 10 pages.

Tian F., "An Agri-food Supply Chain Traceability System for China based on RFID & Blockchain Technology," Service Systems and Service Management (ICSSSM), 2016 13th International Conference on IEEE, 2016, 6 pages.

Umalkar M., et al., "What Every CEO Should Know about Blockchain," https://www.accenture.com/usen/insight-outlook-executives-guide-to-blockchain, Mar. 28, 2016, 6 pages.

Wikipedia, "Blockchain," https://en.wikipedia.org/wiki/Blockchain_(database), Jan. 24, 2017, 16 pages.

Abeyratne S.A., et al., "Blockchain Ready Manufacturing Supply Chain using Distributed Ledger", International Journal of Research in Engineering and Technology, Sep. 2016, vol. 5(9), pp. 1-10.

* cited by examiner

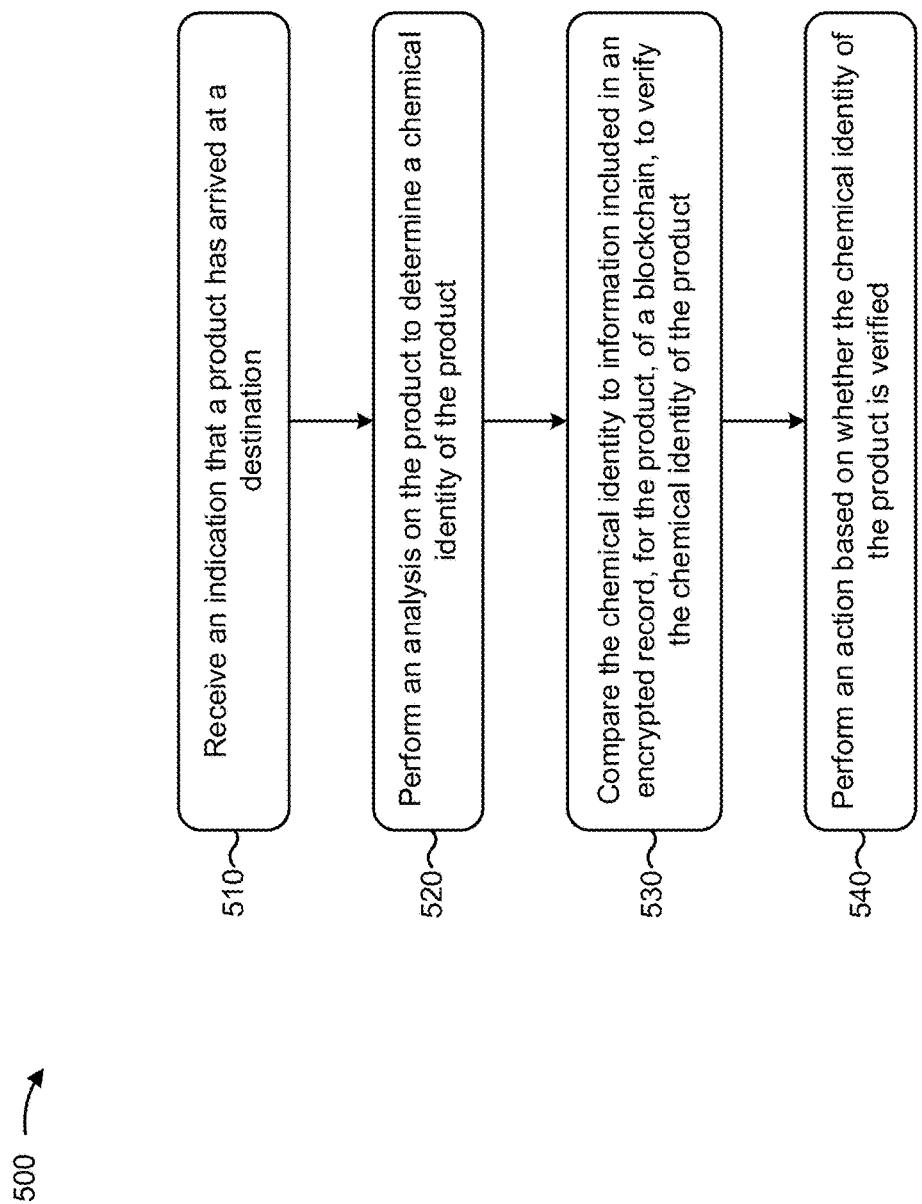

| Type of Item | Mode of Transportation | Sampling Method | Analysis Techniques |
|---|---|---|---|
| Hydrocarbons/Hydrocarbon Products | Truck | - Multiple samples (e.g., oil, gasoline, etc.) from a truck<br>- Multiple samples from different, random points of a truck | - Gas chromatography mass spectrometry<br>- Inductively coupled plasma mass spectrometry<br>- Fourier transform infrared spectroscopy<br>- Time-of-flight secondary ion mass spectrometry<br>- Nuclear magnetic resonance<br>... |
| | Rail | - Multiple samples (e.g., oil, gasoline, etc.) from each tank wagon<br>- Multiple samples from different, random points of a tank wagon | |
| | Vessel | - Multiple samples (e.g., oil, gasoline, etc.) from different, random points of a vessel | |

FIG. 6A

| Type of Item | Mode of Transportation | Sampling Method | Analysis Techniques |
|---|---|---|---|
| Plant/Plant Products | Truck | - Multiple samples (e.g., of a plant/plant product or of multiple plants/plant products) from a truck<br>- Multiple samples from different, random points of a truck | - Gas chromatography<br>- High performance liquid chromatography<br>- Enzyme-linked immunosorbent assay<br>- Liquid chromatography mass spectrometry<br>- Gel permeation chromatography<br>... |
| | Rail | - Multiple samples (e.g., of a plant/plant product or of multiple plants/plant products) from a railway wagon<br>- Multiple samples from different, random points of a railway wagon | |
| | Vessel | - Multiple samples (e.g., of a plant/plant product or of multiple plants/plant products) from different, random points of a vessel | |

FIG. 6B

| Type of Item | Mode of Transportation | Sampling Method | Analysis Techniques |
|---|---|---|---|
| Food Products | Truck | - Multiple samples (e.g., of a food product or of multiple food products) from a truck<br>- Multiple samples from different, random points of a truck | - Gas chromatography<br>- Gel permeation chromatography<br>- High performance liquid chromatography<br>- Ion chromatography<br>- Gas chromatography mass spectrometry<br>... |
| | Rail | - Multiple samples (e.g., of a food product or of multiple food products) from a railway wagon<br>- Multiple samples from different, random points of a railway wagon | |
| | Vessel | - Multiple samples (e.g., of a food product or of multiple food products) from a vessel<br>- Multiple samples from different, random points of a vessel | |

FIG. 6C

| Type of Item | Mode of Transportation | Sampling Method | Analysis Techniques |
|---|---|---|---|
| Materials, Minerals, and/or Metals (and items made thereof) | Truck | - Multiple samples (e.g., of a material, mineral, and/or metal or of multiple items of a particular material, mineral, and/or metal) from a truck<br><br>- Multiple samples from different, random points of a truck | - Glow discharge mass spectrometry<br><br>- Inductively coupled plasma mass spectrometry<br><br>- X-ray fluorescence<br><br>- Energy dispersive x-ray spectroscopy<br><br>- Laser ablation inductively coupled plasma mass spectrometry<br><br>... |
| | Rail | - Multiple samples (e.g., of a material, mineral, and/or metal or of multiple items of a particular material, mineral, and/or metal) from a railway wagon<br><br>- Multiple samples from different, random points of a railway wagon | |
| | Vessel | - Multiple samples (e.g., of a material, mineral, and/or metal or of multiple items of a particular material, mineral, and/or metal) from a vessel<br><br>- Multiple samples from different, random points of a vessel | |

| Type of Item | Mode of Transportation | Sampling Method | Analysis Techniques |
|---|---|---|---|
| Organisms | Truck | - Multiple samples (e.g., of blood, skin, urine, saliva, etc.) from organisms transported by a truck<br>- Multiple samples from different, random organisms transported by a truck | - Nuclear Magnetic Resonance<br>- DNA extraction<br>... |
| | Rail | - Multiple samples (e.g., of blood, skin, urine, saliva, etc.) from organisms transported by a railway wagon<br>- Multiple samples from different, random organisms transported by a railway wagon | |
| | Vessel | - Multiple samples (e.g., of blood, skin, urine, saliva, etc.) from different, random organisms transported by a vessel | |

FIG. 6E

| Type of Item | Mode of Transportation | Sampling Method | Analysis Techniques |
|---|---|---|---|
| Medicine | Truck | - Multiple samples (e.g., of medicine) from a truck<br>- Multiple samples from different, random points of a truck | - High performance liquid chromatography<br>- Gas chromatography<br>- Liquid chromatography mass spectrometry<br>- Ultra-high performance liquid chromatography<br>- Gas chromatography mass spectrometry<br>- Nuclear magnetic resonance<br>... |
| | Rail | - Multiple samples (e.g., of medicine) from a railway wagon or tank wagon<br>- Multiple samples from different, random points of railway wagon or tank wagon | |
| | Vessel | - Multiple samples (e.g., of medicine) from different, random points of a vessel | |

FIG. 6F

| Type of Item | Mode of Transportation | Sampling Method | Analysis Techniques |
|---|---|---|---|
| Cosmetics | Truck | - Multiple samples (e.g., of cosmetics) from a truck<br>- Multiple samples from different, random points of a truck | - Fourier transform infrared spectroscopy<br>- Liquid chromatography mass spectrometry<br>- Gas chromatography mass spectrometry<br>- Nuclear magnetic resonance<br>... |
| | Rail | - Multiple samples (e.g., of cosmetics) from a railway wagon or tank wagon<br>- Multiple samples from different, random points of a railway wagon or tank wagon | |
| | Vessel | - Multiple samples (e.g., of cosmetics) from different, random points of a vessel | |

FIG. 6G

SECURE PRODUCT IDENTIFICATION AND VERIFICATION

RELATED APPLICATIONS

This application is a divisional of U.S. patent application Ser. No. 16/158,809, filed Oct. 12, 2018, which is a divisional of U.S. patent application Ser. No. 15/414,243, filed Jan. 24, 2017 (now U.S. Pat. No. 10,115,068), the contents of which are incorporated herein by reference.

BACKGROUND

A blockchain is a distributed database that maintains a continuously-growing list of records, called blocks, that may be linked together to form a chain. Each block in the blockchain may contain a timestamp and a link to a previous block and/or transaction. The blocks may be secured from tampering and revision. In addition, a blockchain may include a secure transaction ledger database shared by parties participating in an established, distributed network of computers. A blockchain may record a transaction (e.g., an exchange or transfer of information) that occurs in the network, thereby reducing or eliminating the need for trusted/centralized third parties. In some cases, the parties participating in a transaction may not know the identities of any other parties participating in the transaction but can securely exchange information. Further, the distributed ledger may correspond to a record of consensus with a cryptographic audit trail that is maintained and validated by several separate computers.

SUMMARY

According to some possible implementations, a device may include one or more processors to receive information regarding a product to be shipped to a destination. The product may have an origin. The one or more processors may perform an analysis on the product using an analysis technique. The analysis technique may be used to determine a chemical identity of the product. The chemical identity may uniquely identify the product with respect to a plurality of other products from origins differing from the origin of the product. The one or more processors may determine, from the chemical identity, an attribute of the product. The attribute may be an identifier for the product. The one or more processors may create a block or a transaction of a blockchain for the product. The block or the transaction may store the information regarding the product, information identifying the chemical identity of the product, information identifying the attribute of the product, or information identifying a quantity of the product. The blockchain may be accessible during transportation of the product to the destination. The blockchain may be analyzed during transportation of the product to the destination to verify the attribute or the chemical identity.

According to some possible implementations, a method may include receiving, by one or more devices, information regarding an item to be shipped to a destination. The method may include performing, by the one or more devices, an analysis on the item to determine an identifier of the item. The method may include determining, by the one or more devices and from the identifier, an attribute of the item. The method may include creating, by the one or more devices, an encrypted record, for the item, of a blockchain. The encrypted record may include the information regarding the item, information identifying the attribute, and information identifying a term of a contract. The blockchain may be accessible during transportation of the item to the destination. The blockchain may be analyzed, at a plurality of stages during transportation of the item to the destination, to verify the blockchain.

According to some possible implementations, a non-transitory computer-readable medium may store one or more instructions that, when executed by one or more processors, cause the one or more processors to receive an indication that a product has arrived at a destination. The product may have been shipped by an entity to the destination. The one or more instructions may cause the one or more processors to perform an analysis on the product to determine an attribute of the product. The one or more instructions may cause the one or more processors to perform a comparison of information identifying the attribute of the product and information included in an encrypted record, for the product, of a blockchain, to verify the attribute of the product. The information included in the encrypted record may be related to one or more attributes of the product. The one or more attributes of the product may have been determined by the entity that shipped the product to the destination. The one or more instructions may cause the one or more processors to determine whether the attribute of the product is verified based on performing the comparison. The one or more instructions may cause the one or more processors to perform an action based on determining whether the attribute of the product is verified.

BRIEF DESCRIPTION OF THE DRAWINGS

FIG. 5 is a flow chart of another example process for securely identifying and verifying a product;

FIGS. 6A-6G are diagrams of an example data structure described herein;

DETAILED DESCRIPTION

The following detailed description of example implementations refers to the accompanying drawings. The same reference numbers in different drawings may identify the same or similar elements.

A product, such as a commodity, medicine, food, beverages, cosmetics, or the like, may have a chemical identity that is associated with an attribute of the product, such as an origin (e.g., a geographic location) or a quality level of the product. In some cases, entities may want to contract for a particular attribute as part of a transaction. In such a case, however, the entities may lack a technique that permits identification and/or verification of the particular attribute.

Implementations described herein enable entities to determine a chemical identity of a product at each of different stages (e.g., during transportation of the product), to securely store information identifying the chemical identity of the product at each stage using a blockchain database, and to quickly and efficiently verify the chemical identity (e.g., to determine fulfillment of contract terms using a smart contract) by comparing the stored information from different stages. Additionally, implementations described herein enable entities (e.g., companies, regulatory agencies, or insurance entities) to access and/or exchange the stored information in a distributed, secure, and anonymous manner while maintaining fidelity of the stored information.

In this way, security related to a transfer of the product is increased by determining whether an attribute of the product has changed. In addition, security is increased by permitting an analytics system to determine at which stage (e.g., of a supply chain) a product was modified or tampered with. Furthermore, processing resources are conserved by enabling quick and efficient verification of an attribute of the product, and an efficiency related to fulfillment of contract terms is increased. The combination of using a blockchain and a smart contract to securely transport a product and determine satisfaction of a contract term improves a transaction related to the product via security of the blockchain and processing of a smart contract.

Figure 1A:
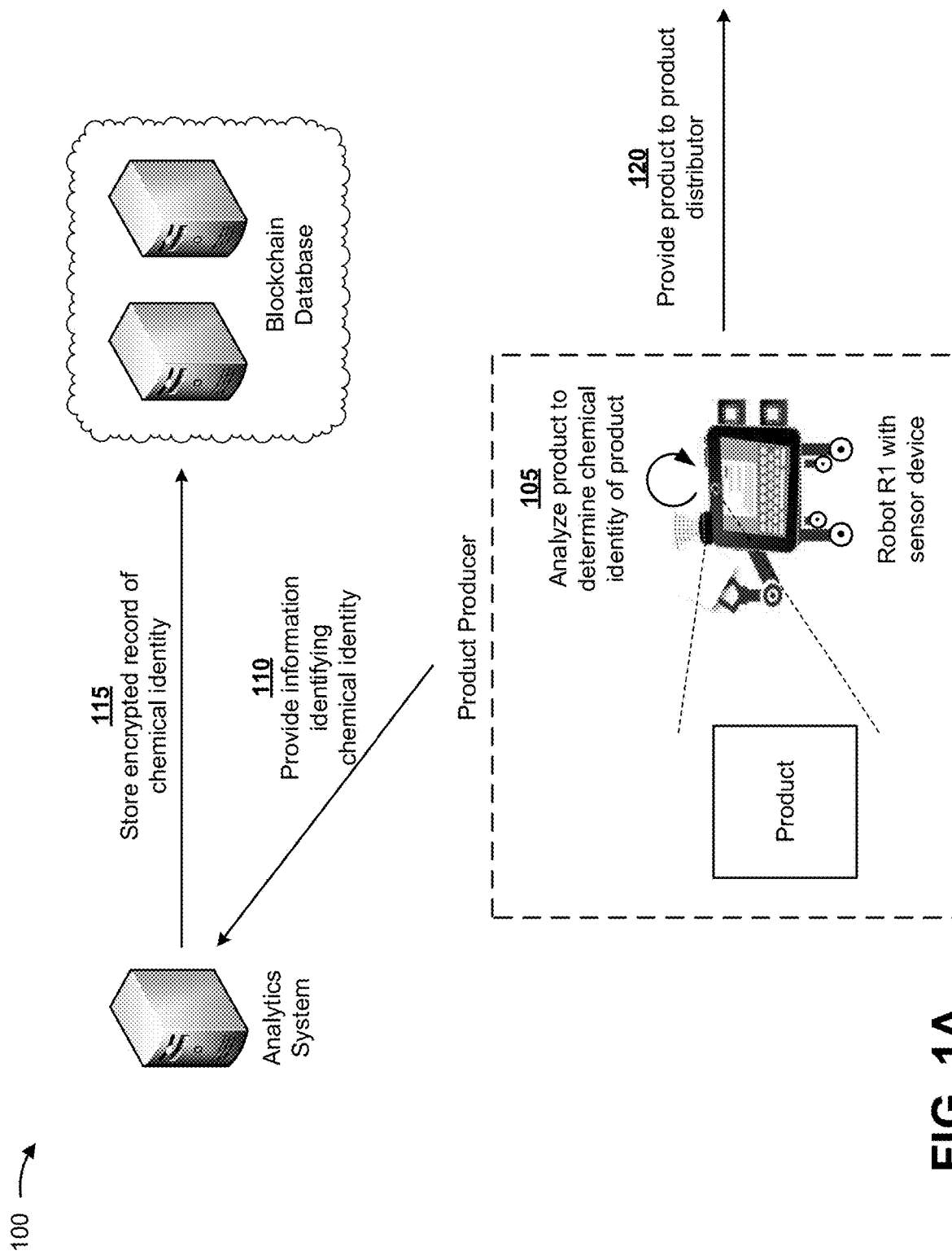
FIGS. 1A-1D are diagrams of an overview of an example implementation described herein.

FIGS. 1A-1D are diagrams of an overview of an example implementation 100 described herein. As shown in FIG. 1A, example implementation 100 may include an analytics system, a blockchain database, and a robot R1, of a product producer, with a sensor device. As shown by reference number 105, robot R1 may use the sensor device (e.g., an infrared spectrometer) to analyze a product of the product producer to determine a chemical identity (e.g., a chemical composition) of the product. The chemical identity may identify an attribute of the product, such as a geographic origin of the product, a particular manufacturing or processing plant from which the product originated, a quality of the product, and/or the like.

As shown by reference number 110, robot R1 may provide information identifying the chemical identity to the analytics system. As shown by reference number 115, the analytics system may store the information identifying the chemical identity in an encrypted record, such as a block, and/or a transaction (e.g., a transfer of information) of a block, in a blockchain database. In some implementations, the analytics system may store additional information in the block and/or transaction with the information identifying the chemical identity. For example, the analytics system may store information identifying the product producer, a calendar date and/or time at which the chemical identity was determined, and/or the like.

As shown by reference number 120, the product producer may provide the product to another entity, such as a product distributor. For example, the product producer may transfer the product to the product distributor via rail, boat, truck, pipeline, vessel, or another mode of transportation.

Figure 1B:
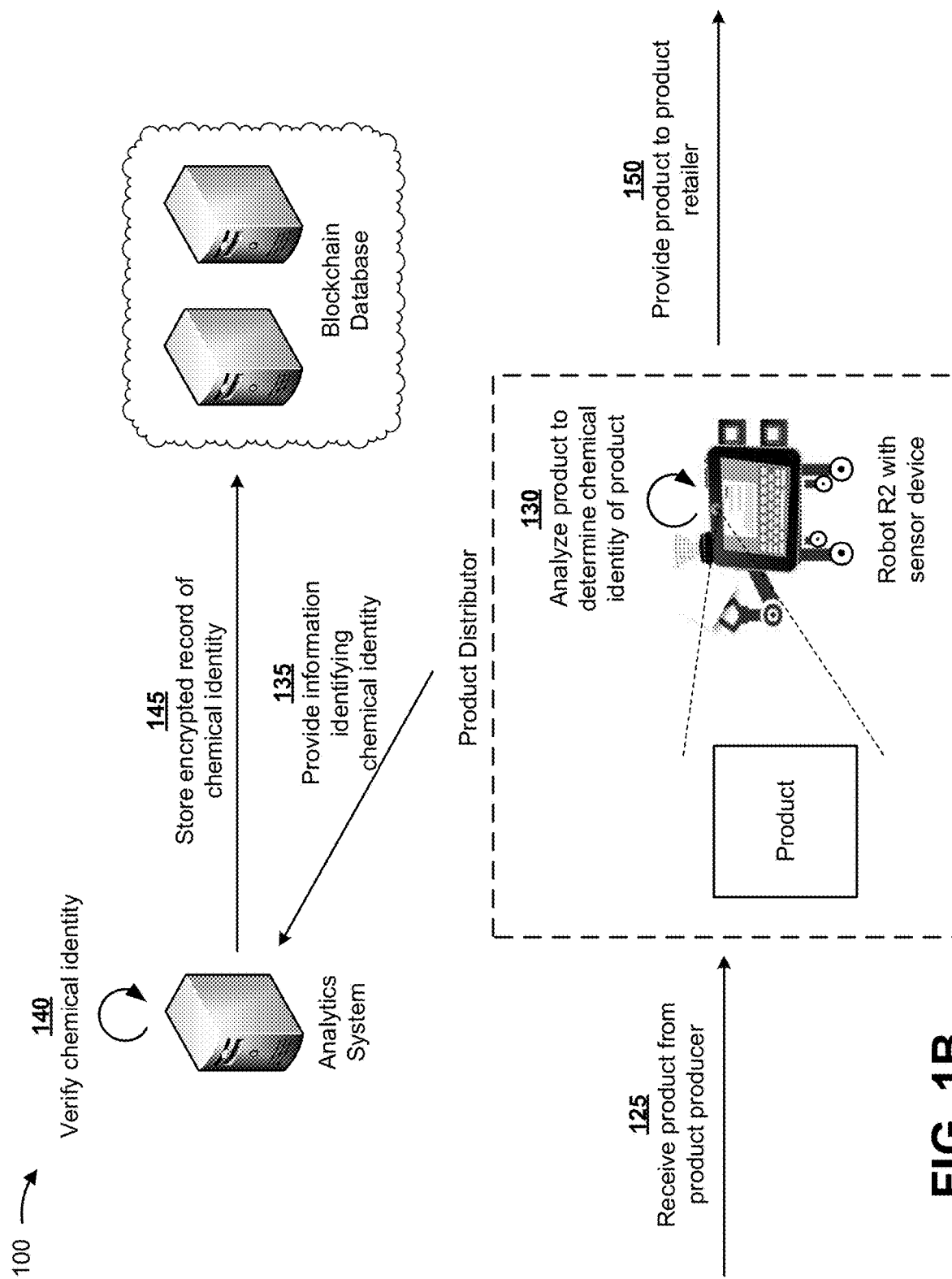

As shown in FIG. 1B, the product distributor may have robot R2 with a sensor device. As shown by reference number 125, the product distributor may receive the product from the product producer. As shown by reference number 130, robot R2 of the product distributor may use the sensor device to analyze the product to determine a chemical identity of the product. The robot of the product distributor may analyze the product in a manner similar to that of robot R1 of the product producer.

As shown by reference number 135, robot R2 of the product distributor may provide information identifying the chemical identity to the analytics system. As shown by reference number 140, the analytics system may verify the chemical identity using the previously stored block and/or transaction in the blockchain database. For example, the analytics system may compare the chemical identity determined by robot R2 of the product distributor to the chemical identity determined by robot R1 of the product producer to verify the chemical identity. Assume, for example, for FIG. 1B that the comparison of the chemical identities indicates a match. As shown by reference number 145, the analytics system may store a block and/or transaction associated with the product distributor (e.g., a block and/or transaction that is in addition to the block and/or transaction associated with the product producer).

As shown by reference number 150, the product distributor may provide the product to another entity, such as a product retailer. For example, similar to the transfer from the product producer to the product distributor, the product distributor may transfer the product to the product distributor via rail, boat, truck, or another mode of transportation.

Figure 1C:
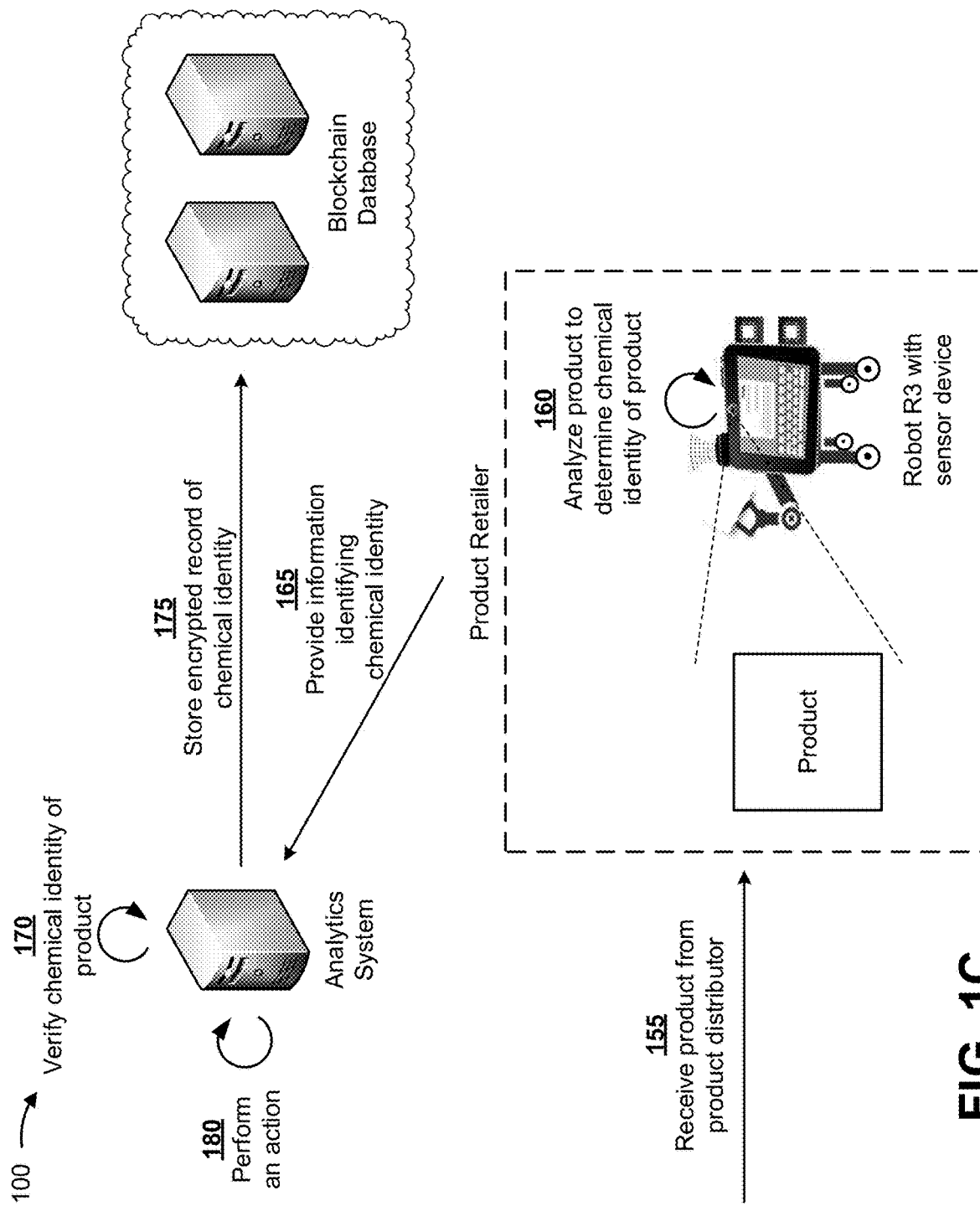

As shown in FIG. 1C, the product retailer may have robot R3 with a sensor device. As shown by reference number 155, the product retailer may receive the product from the product distributor. As shown by reference number 160, robot R3 of the product retailer may use the sensor device to analyze the product to determine a chemical identity of the product. Robot R3 of the product retailer may analyze the product in a manner similar to that of robot R1 of the product producer and/or robot R2 of the product distributor.

As shown by reference number 165, robot R3 of the product retailer may provide information identifying the chemical identity to the analytics system. As shown by reference number 170, the analytics system may verify the chemical identity using the previously stored blocks and/or transactions in the blockchain database. For example, the analytics system may compare the chemical identity determined by robot R3 of the product retailer to the chemical identity determined by robot R1 of the product producer and/or the chemical identity determined by robot R2 of the product distributor to verify the chemical identity. Assume, for example, for FIG. 1C that the comparison of the chemical identities indicates a match. As shown by reference number 175, the analytics system may store a new block and/or transaction associated with the product distributor.

As shown by reference number 180, the analytics system may perform an action (e.g., based on verifying the chemical identity of the product). For example, the analytics system may automatically cause a transfer of a value (e.g., a payment) from the product retailer to another entity. As another example, the analytics system may provide a message (e.g., for display) to a user device of an individual associated with an entity. As another example, the analytics system may store information related to the chemical identity (e.g., a result of verifying the chemical identity, information identifying a stage of a supply chain where a modification to the product occurred, information indicating whether a term of a smart contract is satisfied, etc.).

As another example, the analytics system may determine whether a term of a smart contract is satisfied. In some implementations, a smart contract may include an electronically stored contract where a term of the contract is defined using program code and which can be used to automatically facilitate, verify, execute, and/or enforce negotiation and/or performance of a term of the contract on a distributed ledger. This permits verification of a term of a smart contract via a consensus related to distributed information. In addition, this reduces or eliminates the need for third party verification of contract terms based on specification of events that can occur with respect to the transaction being performed.

In this way, an analytics system may verify a product using a chemical identity of the product and may determine at what point in a series of transfers, if any, an alteration or modification to the product occurred by analyzing a set of blocks and/or transactions (e.g., of a blockchain). This increases security related to a transfer of the product by determining whether an attribute of the product has changed or has been altered during the transfer. In addition, this conserves processing resources by permitting the analytics system to quickly and efficiently verify an attribute of the product (e.g., such as when the product is received from a trusted entity). Furthermore, this increases an efficiency related to fulfillment of contract terms related to the product.

Figure 1D:
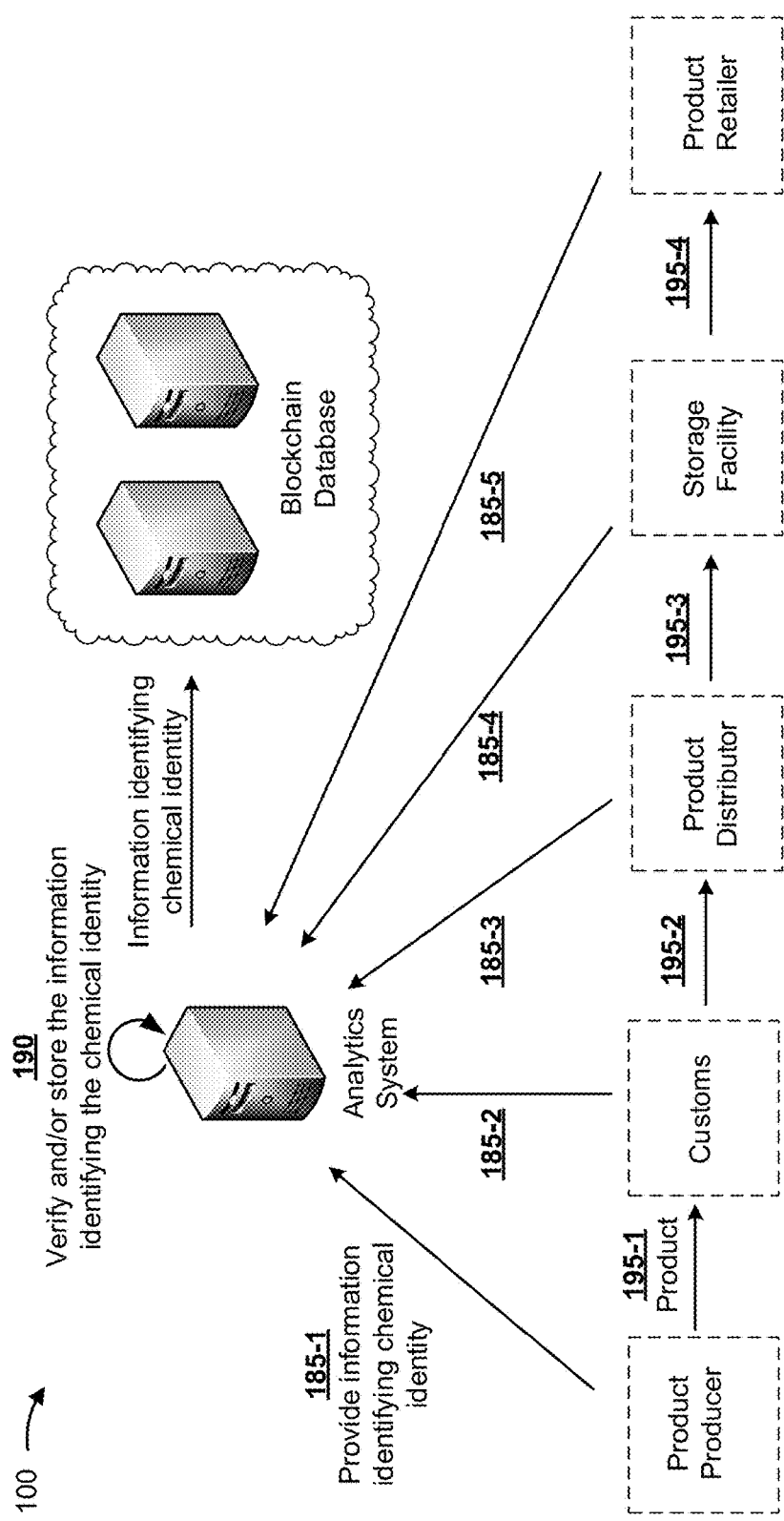

FIG. 1D shows an overview of example implementation 100. As shown in FIG. 1D, and by reference number 185-1, a product producer, using a robot or a system, may provide information identifying the chemical identity of a product to an analytics system. For example, the product producer may provide the information identifying the chemical identity after analyzing the product using the robot. As shown by reference number 190, the analytics system may verify and/or store the information identifying the chemical identity of the product. In this case, the analytics system may store the information identifying the chemical identity in a block (e.g., a genesis block) and/or a transaction of a block, of a blockchain (e.g., using a blockchain database). The analytics system may not verify the chemical identity in this case because the product producer is the first entity to analyze the product. As shown by reference number 195-1, the product producer may ship the product, using a mode of transportation, to customs (e.g., at a port, a border checkpoint, or an airport).

As shown by reference number 185-2, customs may provide information identifying the chemical identity to the analytics system (e.g., using a robot or a system). For example, customs may provide the information identifying the chemical identity to the analytics system based on analyzing the product (e.g., using a robot). As shown by reference number 190, the analytics system may verify and/or store the chemical identity. For example, the analytics system may verify that the information received from customs matches the information stored in the block and/or transaction created based on receiving information from the product producer. Continuing with the previous example, the analytics system may store the information from customs in another block and/or transaction of the blockchain and may link, or associate, the created block, transaction, or other information with the block and/or transaction storing the original information from the product producer. As shown by reference number 195-2, customs may permit the product to be shipped to a product distributor (e.g., based on verifying the chemical identity of the product).

As shown by reference number 185-3, the product distributor may provide information identifying the chemical identity of the product to the analytics system (e.g., based on analyzing the product using a robot). As shown by reference number 190, the analytics system may store and/or verify the chemical identity of the product received by the product producer from customs. For example, the analytics system may verify the chemical identity using the information stored in the blocks and/or transactions created for the product distributor and for customs. In some implementations, the analytics system may create another block and/or transaction to store the information received from the product distributor and may add the other block and/or transaction to the blockchain. As shown by reference number 195-3, the product may be shipped from the product producer to a storage facility.

As shown by reference number 185-4, the storage facility may provide information identifying the chemical identity of the product received from the product distributor to the analytics system (e.g., based on analyzing the product using a robot). As shown by reference number 190, the analytics system may verify and/or store the chemical identity of the product received from the product distributor. For example, the analytics system may compare the information received from the storage facility and information stored in the blocks and/or transactions of the blockchain to verify the chemical identity of the product received from the product distributor. In some implementations, the analytics system may create another block and/or transaction to store the information received from the storage facility and may add the other block and/or transaction to the blockchain. As shown by reference number 195-4, the product may be shipped from the storage facility to a product retailer.

As shown by reference number 185-5, the product retailer may provide information identifying the chemical identity of the product received from the storage facility to the analytics system (e.g., based on analyzing the product using a robot). As shown by reference number 190, the analytics system may verify and/or store the chemical identity of the product received from the storage facility. For example, the analytics system may compare the information received from the product retailer to information stored in each of the blocks and/or transactions of the blockchain to verify the chemical identity of the product received from the storage facility. In some implementations, the analytics system may store the information identifying the chemical identity in a block and/or transaction and may add the block and/or transaction to the blockchain. Additionally, or alternatively, the analytics system may perform another action, such as causing a value associated with the product to be transferred, based on verifying the chemical identity of the product.

As indicated above, FIGS. 1A-1D are provided merely as an example. Other examples are possible and may differ from what was described with regard to FIGS. 1A-1D. For example, verification may be performed at one or more points in a supply chain, such as at each port, checkpoint, or the like, via which a product passes when being transported to a destination (e.g., a product retailer). In addition, verification may be performed when the product arrives at a destination and all blocks and/or transactions have been added to a blockchain and/or at each point between a source and a destination as each block and/or transaction is generated.

Figure 2:
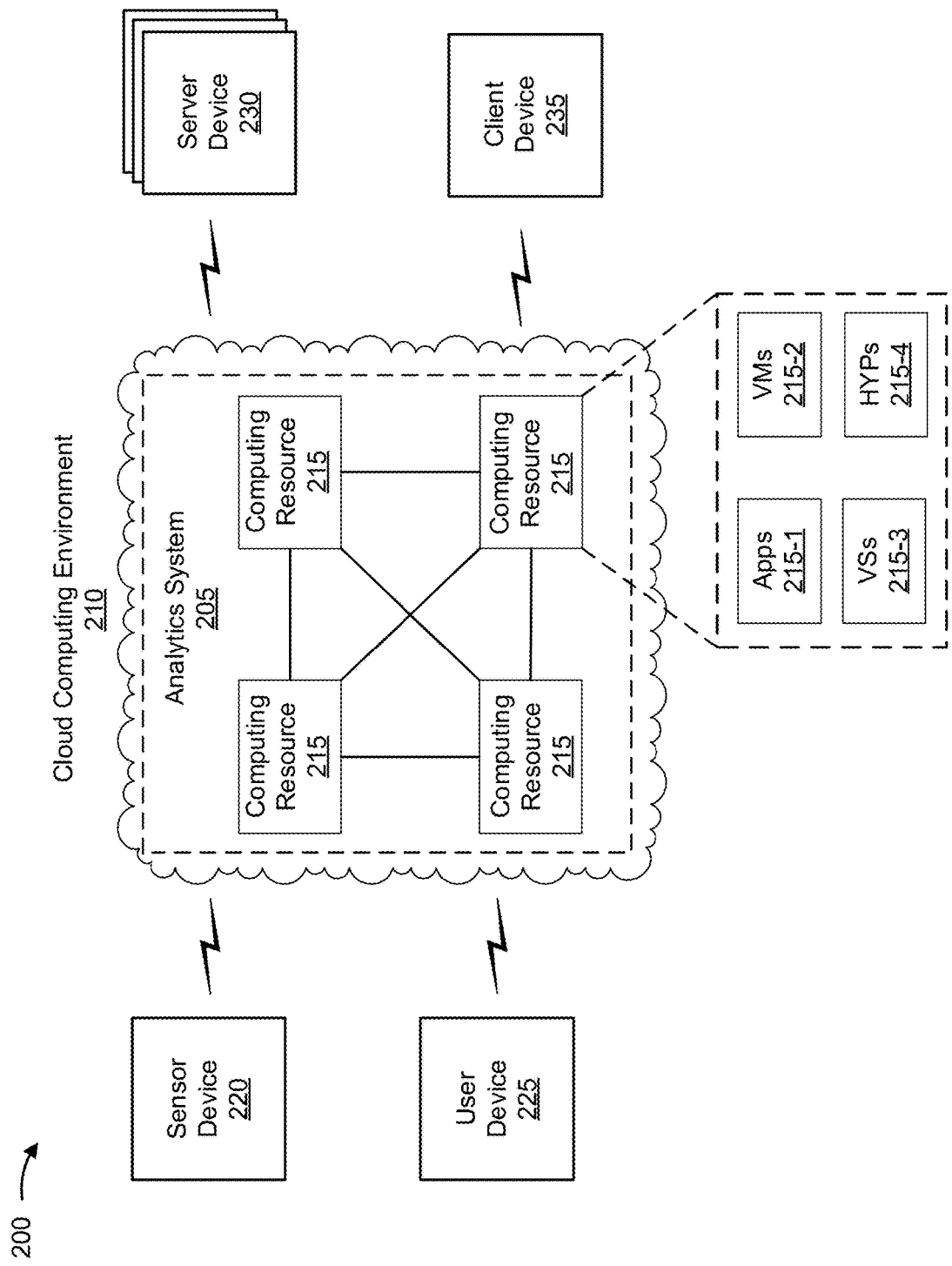
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include an analytics system 205, a cloud computing environment 210, a set of computing resources 215, a sensor device 220, a user device 225, one or more server devices 230 (referred to collectively as "server devices 230," and individually as "server device 230"), and a client device 235. Devices of environment 200 may interconnect via wired connections, wireless connections, or a combination of wired and wireless connections.

Analytics system 205 includes one or more devices capable of determining and/or verifying a chemical identity and/or an attribute (e.g., a quality, a location of origin, etc.) of a product. For example, analytics system 205 may include a cloud server or a group of cloud servers. In some implementations, analytics system 205 may be designed to be modular such that certain software components can be swapped in or out depending on a particular need. As such, analytics system 205 may be easily and/or quickly reconfigured for different uses.

In some implementations, as shown, analytics system 205 may be hosted in cloud computing environment 210. Notably, while implementations described herein describe analytics system 205 as being hosted in cloud computing environment 210, in some implementations, analytics system 205 may not be cloud-based (i.e., may be implemented outside of a cloud computing environment) or may be partially cloud-based.

Cloud computing environment 210 includes an environment that hosts analytics system 205. Cloud computing environment 210 may provide computation, software, data access, storage, etc. services that do not require end-user (e.g., client device 235) knowledge of a physical location and configuration of system(s) and/or device(s) that host analytics system 205. As shown, cloud computing environment 210 may include a group of computing resources 215 (referred to collectively as "computing resources 215" and individually as "computing resource 215").

Computing resource 215 includes one or more personal computers, workstation computers, server devices, or other types of computation and/or communication devices. In some implementations, computing resource 215 may host analytics system 205. The cloud resources may include compute instances executing in computing resource 215, storage devices provided in computing resource 215, data transfer devices provided by computing resource 215, etc. In some implementations, computing resource 215 may communicate with other computing resources 215 via wired connections, wireless connections, or a combination of wired and wireless connections.

As further shown in FIG. 2, computing resource 215 may include a group of cloud resources, such as one or more applications ("APPs") 215-1, one or more virtual machines ("VMs") 215-2, one or more virtualized storages ("VSs") 215-3, or one or more hypervisors ("HYPs") 215-4.

Application 215-1 includes one or more software applications that may be provided to or accessed by one or more devices of environment 200. Application 215-1 may eliminate a need to install and execute the software applications on devices of environment 200. For example, application 215-1 may include software associated with analytics system 205 and/or any other software capable of being provided via cloud computing environment 210. In some implementations, one application 215-1 may send/receive information to/from one or more other applications 215-1, via virtual machine 215-2.

Virtual machine 215-2 includes a software implementation of a machine (e.g., a computer) that executes programs like a physical machine. Virtual machine 215-2 may be either a system virtual machine or a process virtual machine, depending upon use and degree of correspondence to any real machine by virtual machine 215-2. A system virtual machine may provide a complete system platform that supports execution of a complete operating system ("OS"). A process virtual machine may execute a single program, and may support a single process. In some implementations, virtual machine 215-2 may execute on behalf of a user (e.g., client device 235), and may manage infrastructure of cloud computing environment 210, such as data management, synchronization, or long-duration data transfers.

Virtualized storage 215-3 includes one or more storage systems and/or one or more devices that use virtualization techniques within the storage systems or devices of computing resource 215. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 215-4 may provide hardware virtualization techniques that allow multiple operating systems (e.g., "guest operating systems") to execute concurrently on a host computer, such as computing resource 215. Hypervisor 215-4 may present a virtual operating platform to the guest operating systems, and may manage the execution of the guest operating systems. Multiple instances of a variety of operating systems may share virtualized hardware resources.

Sensor device 220 includes one or more devices for obtaining sensor-related information. For example, sensor device 220 may include a spectrometer (e.g., an infrared spectrometer, an ultraviolet spectrometer, or a mass spectrometer), a deoxyribonucleic acid (DNA) analyzer or another device capable of determining a DNA identity of an organism, a camera (e.g., a visual spectrum imaging camera, an infrared or near infrared imaging camera, a multispectral imaging camera, a hyperspectral imaging camera, a thermal imaging camera, a laser mapping imagery camera, etc.), a reader device (e.g., a radio-frequency identification (RFID) reader, a barcode reader, or a Quick response (QR) code reader) to read an RFID tag, a barcode tag, or a QR code tag, or a similar type of device, such as a device that may aid in gathering information related to an attribute of a product. In some implementations, sensor device 220 may be attached to a robot, an unmanned aerial vehicle (UAV), user device 225, or a similar type of device/vehicle. In some implementations, sensor device 220 may gather information associated with a product, such as a chemical identity of the product, a type of the product, a quantity of the product, a quality/grade of the product, or a similar type of information, as described elsewhere herein. Additionally, or alternatively, sensor device 220 may provide the information for transmission to analytics system 205, as described elsewhere herein.

User device 225 includes one or more devices capable of receiving, generating, storing, processing, and/or providing information associated with a product. For example, user device 225 may include a communication and/or computing device, such as a mobile phone (e.g., a smart phone or a radiotelephone), a laptop computer, a tablet computer, a gaming device, a wearable communication device (e.g., a smart wristwatch, a pair of smart eyeglasses, or an activity band), a robot, an unmanned aerial vehicle (UAV), or a similar type of device. In some implementations, user device 225 may transmit information related to a product (e.g., gathered using sensor device 220) to analytics system 205, as described elsewhere herein. Additionally, or alternatively, user device 225 may receive information and/or a message related to a product from analytics system 205, as described elsewhere herein.

Server device 230 includes one or more devices capable of storing, processing, and/or routing information associated with a product. For example, server device 230 may include a server (e.g., in a data center or a cloud computing environment), a data center (e.g., a multi-server micro data center), a workstation computer, a virtual machine (VM) provided in a cloud computing environment, or a similar type of device. In some implementations, server device 230 may include a communication interface that allows server device 230 to receive information from and/or transmit information to other devices in environment 200. In some implementations, server device 230 may receive information associated with a product from analytics system 205 and may store the information (e.g., in a blockchain database), as described elsewhere herein. Additionally, or alternatively, server device 230 may provide the information to analytics system 205, such as to enable analytics system 205 to verify the information, as described elsewhere herein.

Client device 235 includes one or more devices capable of receiving, generating, storing, processing, and/or providing information associated with a product. For example, client device 235 may include a communication and/or computing device, such as a mobile phone (e.g., a smart phone or a radiotelephone), a laptop computer, a tablet computer, a gaming device, a wearable communication device (e.g., a smart wristwatch, a pair of smart eyeglasses, or an activity band), or a similar type of device.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
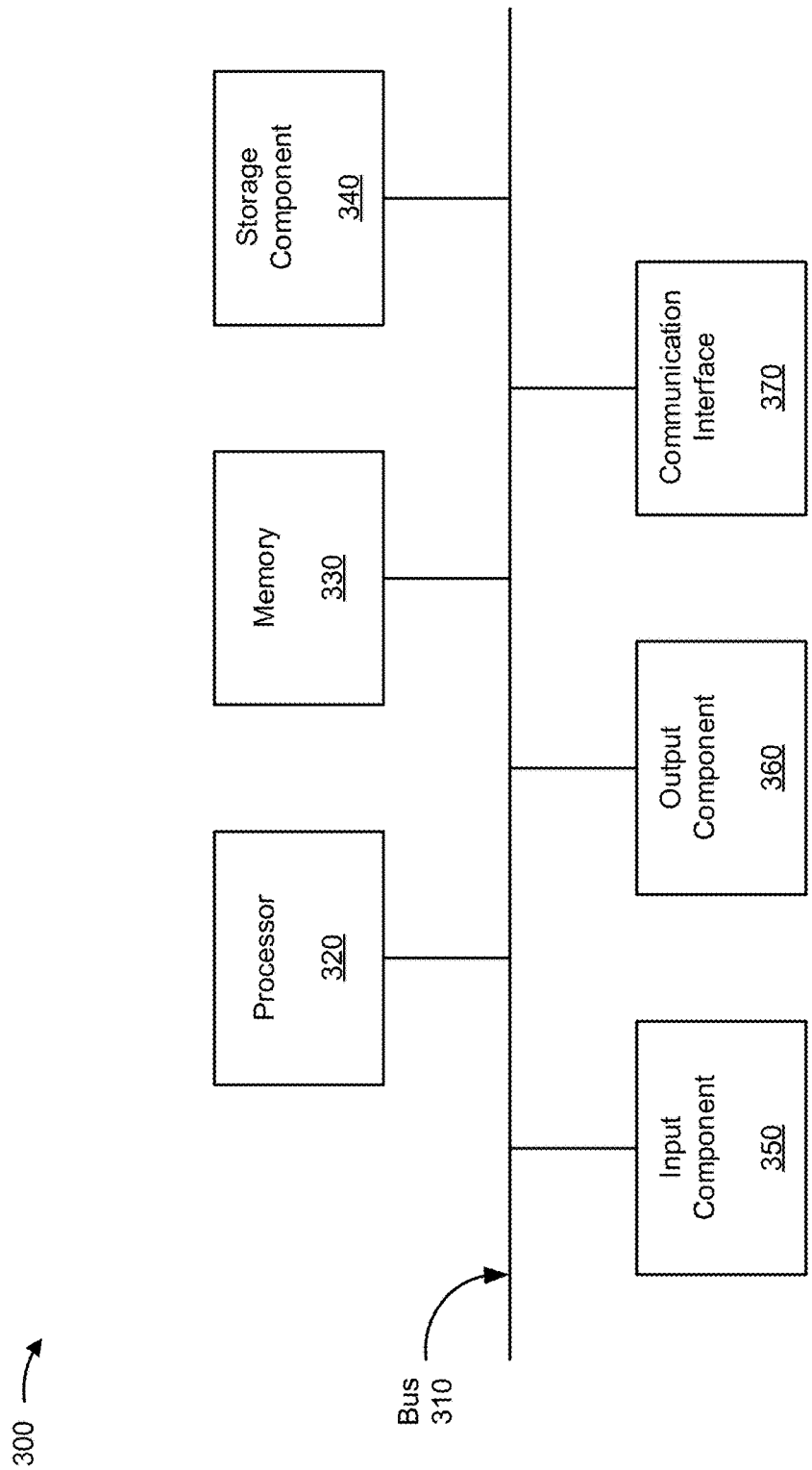
FIG. 3 is a diagram of example components of one or more devices of FIG. 2.

FIG. 3 is a diagram of example components of a device 300. Device 300 may correspond to analytics system 205, cloud computing environment 210, computing resources 215, sensor device 220, user device 225, server device 230, and/or client device 235. In some implementations, analytics system 205, cloud computing environment 210, computing resources 215, sensor device 220, user device 225, server device 230, and/or client device 235 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a processor (e.g., a central processing unit (CPU), a graphics processing unit (GPU), and/or an accelerated processing unit (APU)), a microprocessor, a microcontroller, and/or any processing component (e.g., a field-programmable gate array (FPGA) and/or an application-specific integrated circuit (ASIC)) that interprets and/or executes instructions. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices. In some implementations, a memory device may be cloud-based, partially cloud-based, or not cloud-based.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
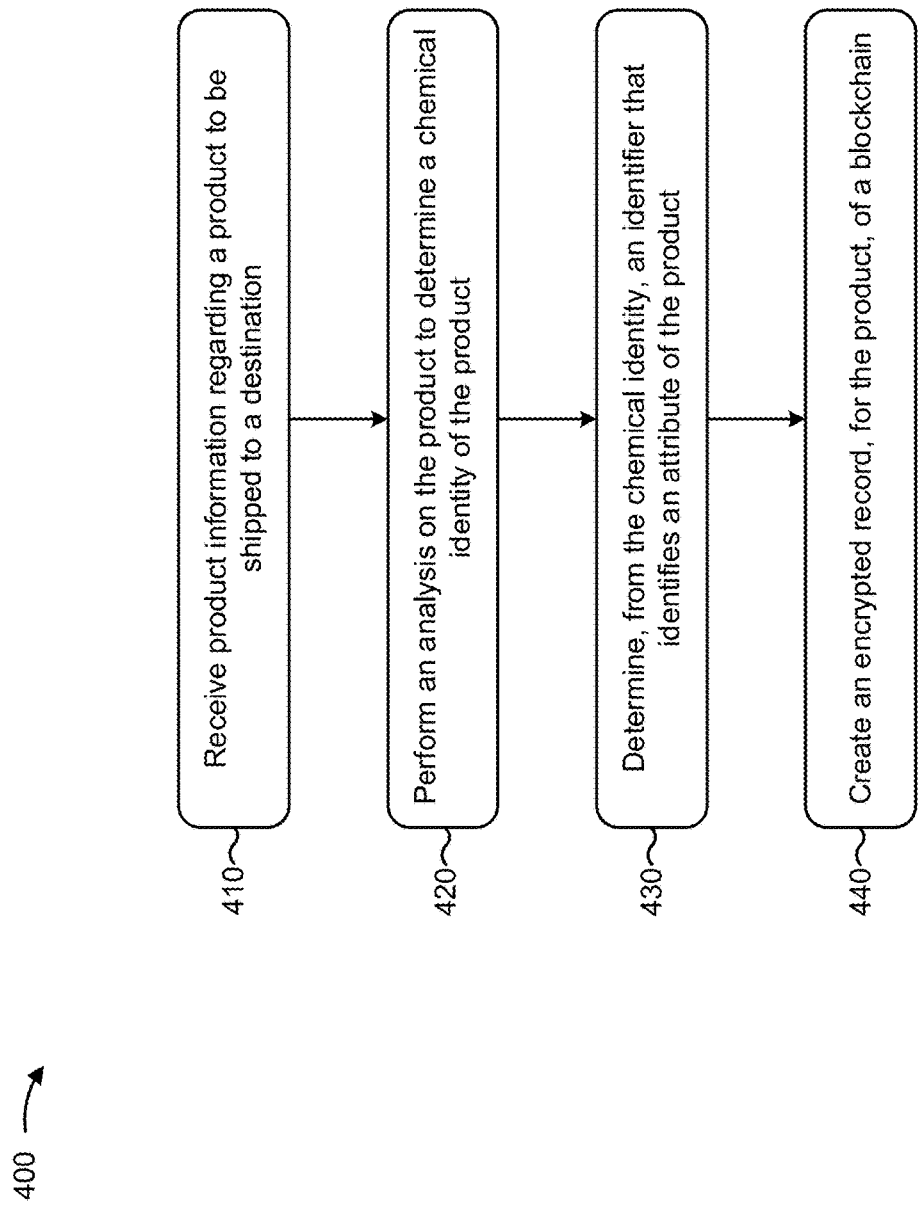
FIG. 4 is a flow chart of an example process for securely identifying and verifying a product.

FIG. 4 is a flow chart of an example process 400 for securely identifying and verifying a product. Specifically, process 400 may relate to a process performed by an entity that produces a product, an entity that ships a product to a destination, an entity that temporarily stores a product, an entity that loads or offloads a product, an entity that checks a product (e.g., customs), an entity that insures a product (e.g., during transportation), an entity that finances a product (e.g., finances purchase of a product using credit), or the like. In some implementations, one or more process blocks of FIG. 4 may be performed by analytics system 205. In some implementations, one or more process blocks of FIG. 4 may be performed by another device or a group of devices separate from or including analytics system 205, such as sensor device 220, user device 225, server device 230, or client device 235.

As shown in FIG. 4, process 400 may include receiving product information regarding a product to be shipped to a destination (block 410). For example, analytics system 205 may receive product information from sensor device 220 (e.g., directly or via user device 225). In some implementations, analytics system 205 may receive the product information periodically, according to a schedule, based on requesting the information, once sensor device 220 gathers the product information, or the like. Additionally, or alternatively, analytics system 205 may receive the product information automatically from another device when sensor device 220 gathers the product information.

In some implementations, analytics system 205 may receive the product information as text. For example, the product information may include a document with text, such as a text file, a text document, a web document (e.g., a webpage), a file that includes text, or the like. In some implementations, analytics system may receive the product information based on processing text to identify terms and/or tags included in the text. For example, analytics system 205 may process the text using natural language processing, text analysis, and/or computational linguistics to identify (e.g., extract) terms, a set of characters, such as a character string, a misspelled word, an acronym, a tag, and/or the like. In some implementations, when analytics system 205 processes text, analytics system 205 may generate a list of unique terms included in the text (e.g., where the unique terms include product information). For example, analytics system 205 may generate a list of unique terms based on identifying the terms and/or the tags. In this way, analytics system 205 may quickly and efficiently gather product information from text.

In some implementations, product information may include information related to a product. For example, product information may include information identifying a product quantity, type, quality, origin, destination, source, and/or the like. In some implementations, product information may be related to a contract for the product. For example, the product information may be related to terms of a contract for the product, such as terms that indicate a quantity, quality, or value of a product.

In some implementations, a product may include anything that can be offered to a market. For example, a product may include any item that can be analyzed to obtain a chemical or molecular identity of the item. In some implementations, a product may include a commodity (refined/unrefined, processed/unprocessed, etc.), such as oil or gasoline, an agricultural product, or a metal. In some implementations, a product may include other items or goods, such as manufactured or refined goods (e.g., food, medicine, or cosmetics). In some implementations, the item being shipped may not be a product but may include an organism, such as animals (e.g., cattle, livestock, or other animals), plants (e.g., flowers, trees, or vegetables), fungus, bacteria, a person (e.g., a passenger of vehicle, such as a vehicle passing via a border check point), and/or the like. In some implementations, the item being shipped may include an infectious agent, such as a virus. In other words, the item being shipped may include any item that can be identified, or have an attribute thereof identified, by a chemical identity, a molecular identity, a DNA identity, and/or the like. In some implementations, a product may include hundreds, thousands, or millions of products, each with a chemical identity and a blockchain.

In this way, analytics system 205 may quickly and efficiently receive product information related to a product.

As further shown in FIG. 4, process 400 may include performing an analysis on the product to determine a chemical identity of the product (block 420). For example, analytics system 205 may perform a spectral analysis, another type of analysis, on the product using sensor device 220. In some implementations, analytics system 205 may perform the analysis to determine a chemical identity of the product.

In some implementations, a chemical identity may include a composition of a product, such as a chemical, molecular, elemental, mineral, or atomic composition, and/or the like. In some implementations, a chemical identity may include a DNA identity or a similar type of identity, such as to identify cattle, livestock, a bacterium, a plant, a person, or a virus. In some implementations, a chemical identity may identify an attribute of the product. For example, an attribute of the product may include a type of the product, a quality and/or grade of the product, an origin location of the product, a manufacturing and/or refining process applied to the product, and/or the like.

In some implementations, an analysis may include a spectral analysis or any other type of analysis technique (e.g., depending on the item to be analyzed). In some implementations, a spectral analysis may include an analysis technique related to a spectrum of frequencies or related qualities, such as energies, eigenvalues, or the like. For example, the spectral analysis may include a spectroscopy technique, such as an infrared (IR) spectroscopy technique, a molecular spectroscopy technique, or an ultraviolet spectroscopy technique. Additionally, or alternatively, the spectral analysis may include any other analysis technique that can identify a chemical identity of a product.

In some implementations, analytics system 205 may identify a particular analysis technique, out of a set of analysis techniques, to perform. In some implementations, analytics system 205 may identify a particular analysis technique to perform based on product information (e.g., a type of the product, a mode of transportation of the product, etc.) and/or input from a user of client device 235. For example, analytics system 205 may determine that the product is oil and that the mode of transportation is a truck (e.g., using product information). In this case, analytics system 205 may determine that an IR spectrometry technique, or any other technique that can provide results that satisfy a threshold accuracy (e.g., 90 percent accurate, 99.9 percent accurate, etc.), combined with random sampling is to be used to analyze the oil, such as by using a data structure that associates information identifying oil transported via a truck and the IR spectrometry technique. In this way, analytics system 205 may quickly and efficiently identify an analysis technique to use to analyze the product, thereby conserving processing resources of analytics system 205. Additional examples of modes of transportation and the analysis techniques that could be used with the modes of transportation are described elsewhere herein.

In some implementations, analytics system 205 may select the analysis technique when analytics system 205 identifies the analysis technique. For example, analytics system 205 may select the analysis technique using a data structure that includes information identifying types of items to analyze, various modes of transportation used to transport the types of items, and various analysis techniques to use based on the type of item being shipped and the mode of transportation being used, as described in more detail elsewhere herein. In some implementations, analytics system 205 may store information identifying the selected analysis technique. For example, analytics system 205 may store information identifying the analysis technique in a block and/or transaction of the blockchain. This improves verification of the product by enabling analytics system 205 to determine the analysis technique used for each verification. In addition, this conserves processing resources by reducing or eliminating the need for analytics system 205 to re-identify the analysis technique for a product.

In some implementations, analytics system 205 may perform the analysis. For example, analytics system 205 may perform the analysis when a product arrives at a destination, when the product is located at a particular stage of transportation on the way to the destination, or when the product is ready to be sent to the destination (e.g., using sensor device 220 or sending a message to sensor device 220 to perform the analysis).

In some implementations, performance of the analysis may vary based on a transportation method of the product. For example, when the product includes oil transported via a pipeline, analytics system 205 may perform the spectral analysis at various time intervals and/or at various points along a pipeline. As another example, when the product includes oil transported via truck, train, vessel, or another vehicle (e.g., in barrels or tanks), analytics system 205 may perform the analysis on a random sample of the oil, such as by randomly selecting barrels or tanks to sample. As another example, analytics system 205 may perform an analysis at various depths of a container, such as when oil is transported via boat or another container (e.g., having a volume that satisfies a threshold). In this way, accuracy of determining a chemical identity is increased by accounting for products that may stratify, or settle into layers, in a container. This improves analysis of the product by permitting dynamic use of various analysis techniques based on a transportation method of the product.

In some implementations, a device other than analytics system 205 may perform the analysis. For example, a user device 225, equipped with sensor device 220, may perform a spectral analysis. In this case, a robot or unmanned aerial vehicle (UAV) equipped with sensor device 220 may perform the analysis. Additionally, or alternatively, a worker using user device 225 may perform the analysis. In some implementations, analytics system 205 may cause the other device to perform the analysis by transmitting a command, a message, or a set of instructions to the other device. Additionally, or alternatively, the other device may automatically perform the analysis based on receiving an indication (e.g., from analytics system 205, server device 230, or client device 235) that a product has arrived at a destination, has arrived at one or more of possibly multiple stages before reaching the destination, or is ready to be shipped to the destination.

In this way, analytics system 205 may quickly and efficiently perform an analysis of a product, thereby conserving processing resources.

As further shown in FIG. 4, process 400 may include determining, from the chemical identity, an identifier that identifies an attribute of the product (block 430). For example, analytics system 205 may determine the source from which the product originated, an identity of a person being transported, or whether an additive has been added to an agricultural product. In some implementations, analytics system 205 may determine the attribute based on the chemical identity of the product.

In some implementations, analytics system 205 may determine the attribute using information stored in a data structure. For example, analytics system 205 may determine the source using a data structure that identifies chemical identities and includes corresponding source identifiers that identify various sources of products. In some implementations, analytics system 205 may compare information identifying the chemical identity of the product to information included in the data structure and determine the attribute of the product when the comparison indicates a match.

In some implementations, analytics system 205 may store the data structure (e.g., locally). Additionally, or alternatively, another device, such as a server device 230, may store the data structure. In some cases, server device 230 may be controlled by an entity different from an entity involved in the production, distribution, and/or retail of the product (e.g., a third party). In some implementations, when server device 230 is controlled by a third party, the third party may include a trusted entity, such as a regulatory entity, a broker, a government entity, and/or the like. In some implementations, when the third party is a trusted entity, the third party may have the authority to store information in the blockchain, to determine whether a term of a contract is satisfied, to verify whether a product or other item was analyzed, to verify a result of the analysis, and/or the like. In this way, security of a transaction related to a product is increased by providing a third party with control of the data structure that stores information about chemical identities and attributes of products. In addition, this improves information sharing across a transportation network or supply chain for a product and increases trust in a shipment of the product.

In some implementations, a source may include a place of origin of the product. For example, a source may include a geographic location or region from which a product originated (e.g., the Gulf of Mexico, the Midwest of the United States, or the North Sea), a manufacturing, refining, and/or processing facility from which the product originated, and/or the like. In some implementations, a source may be identified by a chemical identity of the product. For example, where the product includes oil, minerals in the oil may identify a geographic region from which the oil originated, other chemicals in the oil may identify a particular drilling platform that was used to extract the oil or an entity that extracted the oil, and/or the like.

In this way, analytics system 205 may determine a source and/or other information related to a product based on a chemical identity of the product that can be used to secure the transportation of the product from a source to a destination.

As further shown in FIG. 4, process 400 may include creating an encrypted record, for the product, of a blockchain (block 440). For example, analytics system 205 may create an encrypted record, or transaction/block (e.g., a genesis block), that stores the chemical identity, product information, and/or other information related to the product or related to a transaction involving the product. As another example, analytics system 205 may store a link to other blocks and/or transactions of the blockchain (e.g., encrypted records of previous transactions involving the product, encrypted records of previous spectral analyses, etc.). In some implementations, the block and/or transaction may be included in a set of blocks and/or transactions that form a chain, or a blockchain.

In some implementations, a block of a blockchain may include information related to one or more transactions. For example, a transaction may include an exchange of information between two or more addresses in a network, such as an Internet protocol (IP) addresses, a bitcoin address, or another unique identifier that identifies a particular device or destination for information being exchanged. In some implementations, a transaction may include information that identifies a source of the information being exchanged (e.g., a product producer). Additionally, or alternatively, a transaction may include the information being exchanged (e.g., product information, information identifying a term of a contract, etc.). Additionally, or alternatively, a transaction may include information identifying a destination of the information being exchanged (e.g., a product distributor).

In some implementations, a transaction may be completed using a combination of information identifying a source of information being exchanged and/or a destination for the exchanged information. Additionally, or alternatively, a transaction may be completed using public and private keys, such as to digitally sign a message used to exchange information (e.g., product information).

In some implementations, analytics system 205 may store the block and/or transaction in a blockchain database (e.g., a blockchain database accessible to analytics system 205). For example, analytics system 205 may store the block and/or transaction in a blockchain database that is distributed across multiple server devices 230. In this way, analytics system 205 increases security of storing the chemical identity, product information, and/or other information related to a transaction associated with the product.

In some implementations, analytics system 205 may use a cryptographic technique when creating an encrypted record. For example, analytics system 205 may encrypt product information and/or information identifying a chemical identity using a cryptographic hash function. Continuing with the previous example, when analytics system 205 uses a cryptographic hash function, analytics system 205 may store output (e.g., a digest) of the cryptographic hash function in a block and/or transaction of the blockchain. In this way, analytics system 205 may create an encrypted record for the product, thereby increasing security of storing information related to the product.

In some implementations, analytics system 205 may perform an action (e.g., based on creating the encrypted record). For example, analytics system 205 may transmit a message (e.g., a short message services (SMS) message to an entity indicating that a product is ready to be, or is being, shipped to/from the entity). As another example, analytics system 205 may schedule the product for shipment, such as by adding the product to an electronic queue of products to be shipped. As another example, analytics system 205 may send a message to a vehicle (e.g., a driverless/autonomous truck, train, plane, boat, or other vehicle) to transport the product from a facility of one entity to a facility of another entity, including providing the vehicle with instructions and/or directions from the facility to the other facility. In this way, analytics system 205 may quickly and efficiently send information related to the product.

In some implementations, when transmitting a message to an entity, analytics system 205 may encrypt the message, such as when the message includes product information, information related to a chemical identity of the product, and/or the like. For example, analytics system 205 may encrypt the message using a public-key cryptography technique, or another type of encryption technique. This increases security related to sending information related to the product to various entities.

In this way, analytics system 205 may securely store information related to a product, such as product information and/or information identifying a chemical identity of the product.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIG. 5 is a flow chart of another example process 500 for securely identifying and verifying a product. Specifically, process 500 may relate to a process performed by an entity that receives a product (e.g., a product distributor or a product retailer), that is transporting a product, or the like. In some implementations, one or more process blocks of FIG. 5 may be performed by analytics system 205. In some implementations, one or more process blocks of FIG. 5 may be performed by another device or a group of devices separate from or including analytics system 205, such as sensor device 220, user device 225, server device 230, or client device 235.

As shown in FIG. 5, process 500 may include receiving an indication that a product has arrived at a destination (block 510) and performing an analysis on the product to determine a chemical identity of the product (block 520). For example, analytics system 205 may receive an indication from user device 225, server device 230, or another device that a product has arrived at a facility related to an entity (e.g., a distribution or retail facility related to a product distributor, a product retailer, one or more other points in a supply chain, such as customs, a storage facility, or a transportation facility). In some implementations, analytics system 205 may receive the indication periodically, according to a schedule, based on requesting information related to whether a product has arrived at a particular stage (e.g., a shipping point, a destination, etc.), or based on the product being detected as arriving at the particular location.

In some implementations, analytics system 205 may use historical information related to an amount of travel time between an entity shipping a product and an entity receiving the product to predict or identify a potentially fraudulent shipment. For example, analytics system 205 may identify a shipment where the amount of time for the shipment may indicate that the shipment was diverted from an expected route without authorization, was halted unexpectedly, such as when the product is to be tampered with, and/or the like. In some implementations, when identifying potentially fraudulent shipments, analytics system 205 may compare information identifying an amount of time for a shipment and historical information related to a similar shipment and determine whether a difference between the amounts of time satisfies a threshold. In some implementations, when identifying potentially fraudulent shipments, analytics system 205 may base the identification on other real-time or near real-time information, such as traffic conditions, road conditions, weather conditions, and/or the like to adjust the expected amount of shipping time.

In some implementations, analytics system 205, or another device, may perform an analysis (e.g., a spectral analysis) of the product to determine a chemical identity of the product. For example, analytics system 205 may perform the analysis of the product in a manner similar to that described above. In some implementations, analytics system 205 may use the same technique as was used to previously determine a chemical identity at another point in a supply chain. For example, analytics system 205 may use information stored in a block and/or transaction of a blockchain to identify the analysis technique used at another point in the supply chain to determine the chemical identity. Continuing with the previous example, analytics system 205 may select the same analysis technique based on identifying the analysis technique in the block and/or transaction. In this way, analytics system 205 may determine a chemical identity of the product based on performing the analysis of the product.

As further shown in FIG. 5, process 500 may include comparing the chemical identity to information included in an encrypted record, for the product, of a blockchain, to verify the chemical identity of the product (block 530). For example, analytics system 205 may obtain information from the blockchain that identifies a chemical identity of the product (e.g., by decrypting the encrypted record). In some implementations, analytics system 205 may compare the chemical identity determined from performing the analysis and information included in the encrypted record to verify the chemical identity of the product.

In some implementations, the encrypted record may include a set of blocks and/or transactions of a blockchain. For example, the blockchain may include multiple blocks and/or transactions, where each block and/or transaction was added to the blockchain when an analysis was performed at various points of a supply chain, thereby enabling detection of tampering or modification to the product at, or between, the various points of the supply chain. In some implementations, the encrypted record may relate to a set of previous transactions or analyses. For example, where a product retailer receives a product, the encrypted record may include information identifying a chemical identity determined by a product producer and/or a product distributor prior to the product arriving at the product retailer.

In some implementations, analytics system 205 may compare the chemical identity to multiple chemical identities determined by other entities. For example, analytics system 205 may compare the chemical identity determined when a product retailer received the product to chemical identities previously determined by a product producer and/or a product distributor. In this way, security of verifying the product is increased by enabling analytics system 205 to determine whether a chemical identity of a product has remained the same as the product has been handled by different entities.

In some implementations, analytics system 205 may identify a portion of a supply chain where tampering of a product may have occurred (e.g., in real-time or near real-time). For example, assume that analytics system 205 fails to verify the product at a fourth point in a supply chain. In this case, analytics system 205 may determine that tampering occurred at a third point in the supply chain after verification of the product, at the fourth point in the supply chain, or between the third point and the fourth point. This permits analytics system 205 to quickly and accurately identify a point in a supply chain where tampering may have occurred during transportation of a product.

In some implementations, analytics system 205 may verify the chemical identity of the product. For example, analytics system 205 may verify the chemical identity of the product when a comparison of information identifying the chemical identity and information in the encrypted record match. Conversely, analytics system 205 may not verify the chemical identity when the comparison does not indicate a match.

In some implementations, analytics system 205 may need the chemical identity to match information identified by multiple records to verify the chemical identity. For example, analytics system 205 may need the chemical identity to match information in all blocks and/or transactions of the same blockchain for analytics system 205 to verify the chemical identity. As another example, analytics system 205 may need the chemical identity to match information in a threshold quantity or percentage of blocks and/or transactions of the same blockchain for analytics system 205 to verify the chemical identity. As another example, analytics system 205 may need differences, between proportions or percentages of chemicals that comprise the chemical identity of a product received by an entity and proportions or percentages determined by other entities, to satisfy a threshold. Continuing with the previous example, the threshold may be defined in, or included as a term of, a smart contract or other contractual agreement between parties. Additionally, or alternatively, the threshold may be defined by a third party (e.g., a regulatory entity) or may be established over time based on historical results of the analysis.

In some implementations, the term of a contract between the parties or other information related to the item being shipped may be stored in the blockchain (e.g., in addition to information identifying a chemical identity of the product). In this way, analytics system 205 increases security of verifying a chemical identity of a product and enables verification of the chemical identity as the product is exchanged among different entities. In addition, using a combination of a smart contract and information stored in a blockchain increases security of a transaction, increases security of an item being shipped, and increases an accuracy of verifying the item being shipped.

In some implementations, analytics system 205 may perform decryption or a comparison of encrypted information to verify the chemical identity. For example, when a blockchain database uses a cryptographic hash function to encrypt information related to the product, analytics system 205 may compare an output of the same cryptographic hash function using information received from sensor device 220 and/or user device 225 and an output of the hash function stored in a block and/or transaction of the blockchain database. In this case, analytics system 205 may verify the chemical identity or other information related to the product when the outputs match. In some implementations, analytics system 205 may receive a value (e.g., a prize) for decrypting or verifying the chemical identity.

In this way, analytics system 205 may quickly and efficiently verify the chemical identity of the product.

As further shown in FIG. 5, process 500 may include performing an action based on whether the chemical identity of the product is verified (block 540). For example, analytics system 205 may perform an action related to the product, an attribute of the product, the chemical identity of the product, or a contract associated with the product. In some implementations, analytics system 205 may perform the action based on verifying the chemical identity (e.g., using the encrypted record).

In some implementations, analytics system 205 may create and/or store an encrypted record when analytics system 205 verifies the chemical identity. For example, analytics system 205 may create an encrypted record that includes the determined chemical identity in a manner similar to that described above. Conversely, analytics system 205 may not create and/or store an encrypted record when analytics system 205 does not verify the chemical identity.

In some implementations, analytics system 205 may perform an action related to the product. For example, analytics system 205 may generate a work order to have the product processed for acceptance (e.g., placed on shelves, placed on a vehicle for transportation, incorporated into a manufacturing process, etc.) when the chemical identity is verified, thereby increasing an efficiency of processing the product for acceptance. Additionally, or alternatively, analytics system 205 may send a message to another device, such as user device 225 (e.g., a robot or a device used by a worker), to process the product for acceptance, thereby increasing an efficiency of processing the product for acceptance. In the case of a robot, and for example, the message may cause the robot to unload the product from a vehicle. As another example, analytics system 205 may generate a work order and/or provide instructions to a driverless/autonomous vehicle to return the product (e.g., to a facility of another entity) when analytics system 205 does not verify the product, thereby increasing an efficiency of returning the product.

In some implementations, analytics system 205 may perform an action related to a contract associated with a product. For example, analytics system 205 may cause a value for the product to be transferred when analytics system 205 verifies the chemical identity of the product and/or another attribute related to the product (e.g., quantity, quality, etc.). As another example, analytics system 205 may halt transfer of a value when analytics system 205 does not verify the product. In this way, analytics system 205 may quickly and efficiently perform an action related to a contract associated with the product.

Additionally, or alternatively, analytics system 205 may trigger an alert or send a message, such as a short message service (SMS) message or an email (e.g., to a manager of the entity, a government entity that regulates the product, etc.) depending on whether analytics system 205 verifies the product. In some implementations, the message or alert may be customized or predetermined based on different situations (e.g., based on whether the chemical identity is verified, whether the product is an expected quality, whether an expected quantity of the product was received, etc.). This increases an efficiency of providing information related to the product, thereby conserving processing resources.

Additionally, or alternatively, analytics system 205 may schedule a meeting. For example, analytics system 205 may schedule a meeting among managers of the entity to discuss the product (e.g., by using electronic calendars associated with the managers to identify a meeting time). This increases an efficiency of scheduling a meeting among managers of the entity. Additionally, or alternatively, analytics system 205 may dispatch an investigator to investigate the product, such as when an analysis indicates that the product has been tampered with or altered between two points in a supply chain. For example, analytics system 205 may send a message to user device 225 of an investigator and/or to a dispatch system to dispatch the investigator. This increases an efficiency of causing an investigator to be dispatched to investigate a product.

In this way, analytics system 205 may automatically perform an action related to the product and/or verifying the chemical identity of the product. This increases an efficiency of performing an action based on verifying the product.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

FIGS. 6A-6G are diagrams of an example data structure 600 described herein. For example, data structure 600 may be used by analytics system 205 to select an analysis technique and/or a sampling method for a product based on a type of an item being shipped and/or a mode of transportation being used to transport the item, as described elsewhere herein. As shown in FIG. 6A, data structure 600 may include information that identifies a type of item being shipped, a mode of transportation being used to transport the item, various sampling methods to be used for each mode of transportation, and various analysis techniques to be used to analyze the item. For example, hydrocarbons and/or hydrocarbon products (e.g., oil, gasoline, etc.) may be transported by truck, rail, and/or vessel.

As further shown in FIG. 6A, various sampling methods may be used when hydrocarbons and/or hydrocarbon products are transported using different modes of transportation. In some implementations, the various sampling methods may include random sampling techniques. For example, for oil transported by truck, the sampling method may include obtaining multiple samples from the truck (e.g., from a tank of a truck or from a barrel transported by the truck) and/or obtaining multiple samples from different, random points of a truck (e.g., from different depths of a truck tank, from different points along a length of a truck tank, from different barrels on a truck, etc.). As another example, for oil transported by rail, the sampling method may include obtaining samples in a manner similar to that described with respect to a truck (e.g., obtaining samples from different depths of a tank wagon/tank car, from different barrels on a railway wagon/railroad car, etc.).

As another example, for oil transported by a vessel, the sampling method may include obtaining samples in a manner similar to that described with respect to a truck tank (e.g., obtaining samples from different depths of the vessel, from different points along a length of the vessel, etc.). This may permit samples to be obtained from various length, width, and/or height truck tanks, tank wagons, and/or vessels, thereby improving sampling.

As further shown by FIG. 6A, the information may identify example analysis techniques that can be used to analyze the type of item. For example, for hydrocarbons/hydrocarbon products, analytics system 205 may use gas chromatography mass spectrometry, inductively coupled plasma mass spectrometry, Fourier transform infrared spectroscopy, etc.

In some implementations, a sampling method and/or analysis technique may satisfy a threshold accuracy (e.g., 90 percent accurate, 99.9 percent accurate, etc.) related to the chemical identity or other attribute of the product. For example, the threshold may be defined by a third party, such as a regulatory entity, be included as a term of a smart contract, be based on historical data related to the accuracy of the sampling method and/or the analysis technique, and/or the like. FIGS. 6B-6G show information similar to that described with respect to FIG. 6A for other types of items.

As indicated above, FIGS. 6A-6G are provided merely as an example. Other examples are possible and may differ from what was described with regard to FIGS. 6A-6G.

Figure 7:
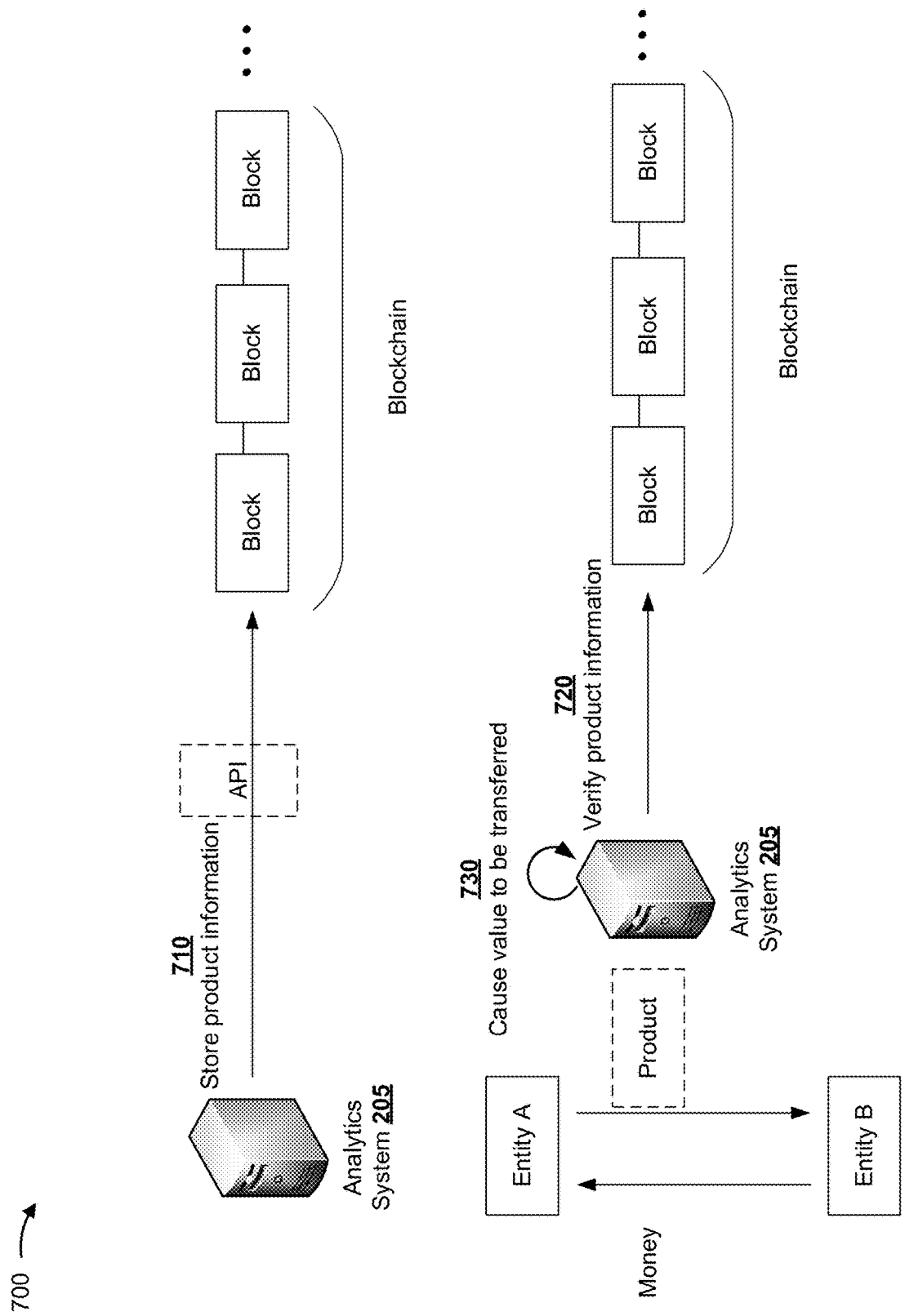
FIG. 7 is a diagram of another example implementation described herein.

FIG. 7 is a diagram of an example implementation 700 described herein. As shown in FIG. 7, and by reference number 710, analytics system 205 may store product information in a blockchain using an application program interface (API). For example, analytics system 205 may store the product information based on performing an analysis of the product being shipped.

As further shown in FIG. 7, entity A may provide a product to entity B (e.g., using a mode of transportation). As shown by reference number 720, analytics system 205 may verify product information of the product when entity B receives the product from entity A. For example, analytics system 205 may use an analysis technique to determine product information of the shipped product and may compare the determined product information and product information stored in a blockchain to verify the shipped product. As shown by reference number 730, analytics system 205 may cause a value to be transferred based on verifying the product information and/or determining that a term of a smart contract has been satisfied. For example, analytics system 205 may cause money to be transferred from entity B to entity A. In this way, analytics system 205 may quickly and securely verify terms of a contract based on verifying product information of a product shipped from one entity to another. This increases an efficiency and security of the transaction.

As indicated above, FIG. 7 is provided merely as an example. Other examples are possible and may differ from what was described with regard to FIG. 7.

Figure 8:
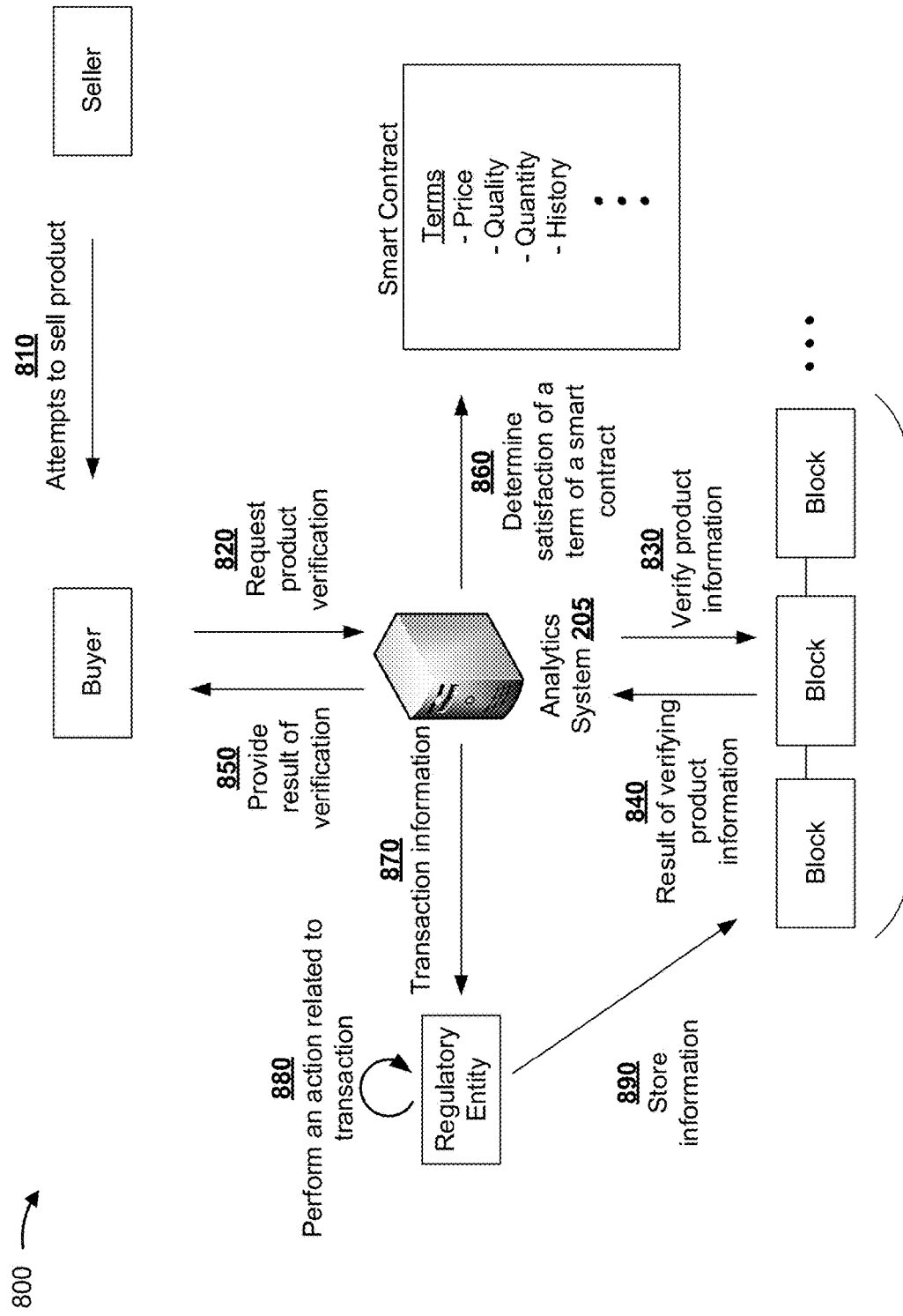
FIG. 8 is a diagram of another example implementation described herein.

FIG. 8 is a diagram of an example implementation 800 described herein. As shown in FIG. 8, and by reference number 810, a seller may attempt to sell a product to a buyer. As shown by reference number 820, the buyer may request that analytics system 205 verify the product (e.g., by verifying product information). As shown by reference number 830, analytics system 205 may verify the product information (e.g., determined from an analysis of the product) by comparing the determined product information to information stored in a blockchain, such as publically accessible information. As shown by reference number 840, analytics system 205 may determine a result of verifying the product information. In some implementations, analytics system 205 may determine a result of the verification by determining whether the comparison indicates a match.

As shown by reference number 850, analytics system 205 may provide information to the sender indicating a result of the verification (e.g., whether the product information is verified or not verified). For example, analytics system 205 may provide a message indicating that the product information was verified. As another example, analytics system 205 may provide an alert message to the buyer, such as when the product information is not verified. As shown by reference number 860, analytics system 205 may determine whether a term of a smart contract has been satisfied. In some implementations, analytics system 205 may perform an action based on determining that the term of the smart contract is satisfied (e.g., cause a value to be transferred from an account of the buyer to an account of the seller).

As shown by reference number 870, analytics system 205 may provide transaction information to another entity (e.g., a regulatory entity). For example, analytics system 205 may provide information indicating the type of product transacted, a value exchanged, whether the seller and/or buyer are registered or licensed, and/or the like. As shown by reference number 880, the entity may perform an action related to the transaction. For example, a regulatory entity may store a record of the transaction, blacklist a buyer and/or a seller based on the transaction violating a rule and/or a law, and/or the like.

As shown by reference number 890, the regulatory entity may store information in the blockchain related to the transaction. For example, the regulatory entity may use analytics system 205 to store a blacklist, a crime report, policy information, and/or the like. In some implementations, the information stored by the regulatory entity may be private and accessible by a particular entity (e.g., another regulatory entity, a governmental entity, a law enforcement entity, etc.). In this way, the blockchain may store private information, such as a blacklist, and/or public information, such as a chemical identity. In this way, analytics system 205 may quickly and securely verify a term of a contract based on verifying product information of a product shipped from one entity to another. This increases an efficiency and security of the transaction.

As indicated above, FIG. 8 is provided merely as an example. Other examples are possible and may differ from what was described with regard to FIG. 8.

Implementations described herein enable an analytics system to determine a chemical identity of a product at each of different stages of transfer (e.g., during transportation of the product), to securely store information identifying the chemical identity of the product at each stage using a blockchain database, and to quickly and efficiently verify the chemical identity (e.g., to determine fulfillment of contract terms) by comparing the stored information from different stages. In this way, security related to a transfer of the product is increased by determining whether an attribute of the product has changed as the product is exchange/transported among entities, sub-entities of an entity, facilities of one or more entities, and/or the like. Furthermore, processing resources are conserved by enabling quick and efficient verification of the chemical identity and/or an attribute of the product, and an efficiency related to fulfillment of contract terms is increased.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   receiving, by a device, an indication that a product has arrived at a destination,
      the product having been shipped by an entity to the destination;
   performing, by the device, an analysis on the product to determine a chemical identity of the product;
   performing, by the device and based on performing the analysis, a comparison of information identifying the chemical identity of the product and information included in an encrypted record, for the product, of a blockchain, to verify an attribute of the product,
      the information included in the encrypted record being related to one or more attributes of the product,
         the one or more attributes of the product having been determined by the entity that shipped the product to the destination;
   determining, by the device, whether the attribute of the product is verified based on performing the comparison; and
   performing, by the device, an action based on determining whether the attribute of the product is verified,
      wherein performing the action comprises one of:
         creating another encrypted record that includes the information identifying the chemical identity of the product,
         providing a first set of instructions to another device to cause the other device to unload the product from a vehicle used to ship the product, or
         providing a second set of instructions to a driverless or autonomous vehicle to return to the product to the entity that shipped the product.

2. The method of claim 1, wherein performing the comparison comprises:
   performing the comparison using multiple encrypted records,
      the multiple encrypted records being associated with multiple analyses performed at multiple stages during transportation of the product to the destination; and
   wherein determining whether the attribute of the product is verified comprises:
      determining whether the attribute is verified based on performing the comparison using the multiple encrypted records.

3. The method of claim 1, wherein information identifying the analysis or a manner in which to perform the analysis is included in the encrypted record; and
   wherein performing the analysis comprises:
      performing the analysis based on the information identifying the analysis or the manner in which to perform the analysis being included in the encrypted record.

4. The method of claim 1, wherein determining whether the attribute of the product is verified comprises:
   determining that the attribute of the product is not verified based on performing the comparison; and
   wherein performing the action comprises:
      providing, based on determining that the attribute of the product is not verified, the second set of instructions to the driverless or autonomous vehicle to return the product to the entity that shipped the product.

5. The method of claim 1, wherein determining whether the attribute of the product is verified comprises:
   determining that the attribute of the product is not verified based on performing the comparison;
   wherein performing the action comprises:
      providing, based on determining that the attribute of the produce is not verified, the second set of instructions to the driverless or autonomous vehicle to return to the product to the entity that shipped the product; and
   wherein the method further comprises:
      triggering an alert based on determining that the attribute of the product is not verified.

6. The method of claim 1, wherein determining whether the attribute of the product is verified comprises:
   determining that the attribute of the product is verified based on performing the comparison; and
   wherein performing the action comprises:
      providing the first set of instructions to the other device to cause the other device to unload the product from the vehicle used to ship the product based on determining that the attribute of the product is verified.

7. The method of claim 1, wherein determining whether the attribute of the product is verified comprises:
   determining that the attribute of the product is verified based on performing the comparison; and
   wherein performing the action comprises:
      creating, based on determining that the attribute of the product is verified, the other encrypted record that includes the information identifying the chemical identity of the product.

8. A device, comprising:
   one or more memories; and
   one or more processors communicatively coupled to the one or more memories, configured to:
      receive an indication that a product has arrived at a destination,
         the product having been shipped by an entity to the destination;
      perform an analysis on the product to determine a chemical identity of the product;
      perform, based on performing the analysis, a comparison of information identifying the chemical identity of the product and information included in an encrypted record, for the product, of a blockchain, to verify an attribute of the product,
         the information included in the encrypted record being related to one or more attributes of the product,
            the one or more attributes of the product having been determined by the entity that shipped the product to the destination;
      determine whether the attribute of the product is verified based on performing the comparison; and perform an action based on determining whether the attribute of the product is verified,
wherein the one or more processors, when performing the action, are configured to one of:
create another encrypted record that includes the information identifying the chemical identity of the product,
provide a first set of instructions to another device to cause the other device to unload the product from a vehicle used to ship the product, or
provide a second set of instructions to a driverless or autonomous vehicle to return to the product to the entity that shipped the product.

9. The device of claim 8, wherein the one or more processors, when performing the comparison, are configured to:
perform the comparison using multiple encrypted records,
the multiple encrypted records being associated with multiple analyses performed at multiple stages during transportation of the product to the destination; and
wherein the one or more processors, when determining whether the attribute of the product is verified, are configured to:
determine whether the attribute is verified based on performing the comparison using the multiple encrypted records.

10. The device of claim 8, wherein information identifying the analysis or a manner in which to perform the analysis is included in the encrypted record; and
wherein the one or more processors, when performing the analysis, are configured to:
perform the analysis based on the information identifying the analysis or the manner in which to perform the analysis being included in the encrypted record.

11. The device of claim 8, wherein the one or more processors, when determining whether the attribute of the product is verified, are configured to:
determine that the attribute of the product is not verified based on performing the comparison; and
wherein the one or more processors, when performing the action, are configured to:
provide the second set of instructions to the driverless or autonomous vehicle to return the product to the entity that shipped the product based on determining that the attribute of the product is not verified.

12. The device of claim 8, wherein the one or more processors, when determining whether the attribute of the product is verified, are configured to:
determine that the attribute of the product is not verified based on performing the comparison;
wherein the one or more processors, when performing the action, are configured to:
provide the second set of instructions to the driverless or autonomous vehicle to return the product to the entity that shipped the product based on determining that the attribute of the product is not verified; and
wherein the one or more processors are further configured to:
trigger an alert based on determining that the attribute of the product is not verified.

13. The device of claim 8, wherein the one or more processors, when determining whether the attribute of the product is verified, are configured to:
determine that the attribute of the product is verified based on performing the comparison; and
wherein the one or more processors, when performing the action, are configured to:
provide, based on determining that the attribute of the product is verified, the first set of instructions to the other device to cause the other device to unload the product from the vehicle used to ship the product.

14. The device of claim 8, wherein the one or more processors, when determining whether the attribute of the product is verified, are configured to:
determine that the attribute of the product is verified based on performing the comparison; and
wherein the one or more processors, when performing the action, are configured to:
create, based on determining that the attribute of the product is verified, the other encrypted record that includes the information identifying the chemical identity of the product.

15. A non-transitory computer-readable medium storing instructions, the instructions comprising:
one or more instructions that, when executed by one or more processors, cause the one or more processors to:
receive an indication that a product has arrived at a destination,
the product having been shipped by an entity to the destination;
perform an analysis on the product to determine a chemical identity of the product;
perform, based on performing the analysis, a comparison of information identifying the chemical identity of the product and information included in an encrypted record, for the product, of a blockchain, to verify an attribute of the product,
the information included in the encrypted record being related to one or more attributes of the product,
the one or more attributes of the product having been determined by the entity that shipped the product to the destination;
determine whether the attribute of the product is verified based on performing the comparison; and
perform an action based on determining whether the attribute of the product is verified,
wherein the one or more instructions, that cause the one or more processors to perform the action, cause the one or more processors to one of:
create another encrypted record that includes the information identifying the chemical identity of the product,
provide a first set of instructions to a device to cause the device to unload the product from a vehicle used to ship the product, or
provide a second set of instructions to a driverless or autonomous vehicle to return to the product to the entity that shipped the product.

16. The non-transitory computer-readable medium of claim 15, wherein the one or more instructions, that cause the one or more processors to perform the comparison, cause the one or more processors to:
perform the comparison using multiple encrypted records,
the multiple encrypted records being associated with multiple analyses performed at multiple stages during transportation of the product to the destination; and
wherein the one or more instructions, that cause the one or more processors to determine whether the attribute of the product is verified, cause the one or more processors to:

determine whether the attribute is verified based on performing the comparison using the multiple encrypted records.

17. The non-transitory computer-readable medium of claim 15, wherein information identifying the analysis or a manner in which to perform the analysis is included in the encrypted record; and
    wherein the one or more instructions, that cause the one or more processors to perform the analysis, cause the one or more processors to:
        perform the analysis based on the information identifying the analysis or the manner in which to perform the analysis included in the encrypted record.

18. The non-transitory computer-readable medium of claim 15, wherein the one or more instructions, that cause the one or more processors to determine whether the attribute of the product is verified, cause the one or more processors to:
    determine that the attribute of the product is not verified based on performing the comparison; and
    wherein the one or more instructions, that cause the one or more processors to perform the action, cause the one or more processors to:
        provide, based on determining that the attribute of the product is not verified, the second set of instructions to the driverless or autonomous vehicle to return the product to the entity that shipped the product.

19. The non-transitory computer-readable medium of claim 15, wherein the one or more instructions, that cause the one or more processors to determine whether the attribute of the product is verified, cause the one or more processors to:
    determine that the attribute of the product is not verified based on performing the comparison;
    wherein the one or more instructions, that cause the one or more processors to perform the action, cause the one or more processors to:
        provide the second set of instructions to the driverless or autonomous vehicle to return the product to the entity that shipped the product based on determining that the attribute of the product is not verified; and
    wherein the one or more instructions, when executed by the one or more processors, further cause the one or more processors to:
        trigger an alert based on determining that the attribute of the product is not verified.

20. The non-transitory computer-readable medium of claim 15, wherein the one or more instructions, that cause the one or more processors to determine whether the attribute of the product is verified, cause the one or more processors to:
    determine that the attribute of the product is verified based on performing the comparison; and
    wherein the one or more instructions, that cause the one or more processors to perform the action, cause the one or more processors to:
        provide, based on determining that the attribute of the product is verified, the first set of instructions to the device to cause the device to unload the product from the vehicle used to ship the product.

\* \* \* \* \*